United States Patent
Chae et al.

(10) Patent No.: US 12,438,140 B2
(45) Date of Patent: Oct. 7, 2025

(54) METHOD OF MANUFACTURING NEGATIVE ELECTRODE

(71) Applicant: LG ENERGY SOLUTION, LTD., Seoul (KR)

(72) Inventors: Oh Byong Chae, Daejeon (KR); Ye Ri Kim, Daejeon (KR); Su Yeon Lee, Daejeon (KR); Seo Young Jeon, Daejeon (KR); Seung Hae Hwang, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 620 days.

(21) Appl. No.: 17/797,232

(22) PCT Filed: May 18, 2021

(86) PCT No.: PCT/KR2021/006191
§ 371 (c)(1),
(2) Date: Aug. 3, 2022

(87) PCT Pub. No.: WO2021/235816
PCT Pub. Date: Nov. 25, 2021

(65) Prior Publication Data
US 2023/0072109 A1  Mar. 9, 2023

(30) Foreign Application Priority Data
May 18, 2020  (KR) .......... 10-2020-0059135

(51) Int. Cl.
*H01M 4/04* (2006.01)
*H01M 4/139* (2010.01)
*H01M 4/02* (2006.01)

(52) U.S. Cl.
CPC ....... *H01M 4/0452* (2013.01); *H01M 4/0404* (2013.01); *H01M 4/0416* (2013.01); *H01M 4/139* (2013.01); *H01M 2004/027* (2013.01)

(58) Field of Classification Search
CPC .. H01M 4/0452; H01M 4/0404; H01M 4/049; H01M 4/04; H01M 4/13;
(Continued)

(56) References Cited

U.S. PATENT DOCUMENTS 5,595,837 A   1/1997   Olsen et al.
5,743,921 A   4/1998   Nazri et al.
(Continued)

FOREIGN PATENT DOCUMENTS

CN   208447826 U   9/2018
CN   109103496 A   12/2018
(Continued)

OTHER PUBLICATIONS

Lee-et-al-2015-controlled-prelithiation-of-silicon Monoxide for High Performance Lithium-Ion Rechargeable Full Cells, ACS Publications (Year: 2015).*
(Continued)

*Primary Examiner* — Milton I Cano
*Assistant Examiner* — Katherine J Metzger
(74) *Attorney, Agent, or Firm* — Birch, Stewart, Kolasch & Birch, LLP

(57) ABSTRACT

A method of manufacturing a negative electrode wherein, in the pre-lithiation of a negative electrode structure including a negative electrode active material layer formed therein through electrochemical charging in a roll-to-roll manner, the negative electrode active material layer is divided into a central part and a side part. The charge current applied to the central part is higher than the charge current applied to the side part. In addition, in the method of manufacturing the
(Continued)

negative electrode a pre-lithiation section is divided into a first section and a second section, the central part is electrochemically charged in the first section, the side part is electrochemically charged in the second section, and the central part and the side part are alternately electrochemically charged in one or more cycles.

14 Claims, 4 Drawing Sheets

(58) Field of Classification Search
CPC .... H01M 4/133; H01M 4/134; H01M 4/1391; H01M 4/587; H01M 4/0461; H01M 4/0459; H01M 4/1393; H01M 4/1395; H01M 4/364; H01M 4/366; H01M 4/483; H01M 4/0445; H01M 4/139; H01M 4/661; H01M 4/0416; H01M 2004/027; H01M 10/052; H01M 10/0525; H01M 10/058; H01M 10/446; Y02E 60/10
See application file for complete search history.

(56) References Cited

U.S. PATENT DOCUMENTS

| | | |
|---|---|---|
| 2013/0045427 A1 | 2/2013 | Zhamu et al. |
| 2013/0327648 A1 | 12/2013 | Grant et al. |
| 2015/0191841 A1 | 7/2015 | Grant et al. |
| 2017/0187030 A1 | 6/2017 | Grant et al. |
| 2017/0338480 A1 | 11/2017 | Kim et al. |
| 2019/0109321 A1 | 4/2019 | Grant et al. |
| 2019/0109322 A1 | 4/2019 | Grant et al. |
| 2021/0313558 A1 | 10/2021 | Kim et al. |
| 2021/0399274 A1 | 12/2021 | Grant et al. |

FOREIGN PATENT DOCUMENTS

| | | |
|---|---|---|
| CN | 109742325 A | 5/2019 |
| CN | 110212152 A | 9/2019 |
| JP | 9-22690 A | 1/1997 |
| JP | 10-83835 A | 3/1998 |
| KR | 10-0291067 B1 | 6/2001 |
| KR | 20150014877 A * | 2/2015 |
| KR | 10-1694784 B1 | 2/2016 |
| KR | 10-1771122 B1 | 9/2017 |
| KR | 10-1783447 B1 | 10/2017 |
| KR | 10-2018-0091068 A | 8/2018 |
| KR | 10-2019-0083304 A | 7/2019 |
| KR | 10-2019-0141915 A | 12/2019 |
| KR | 10-2020-0035885 A | 4/2020 |
| WO | WO 2013/082330 A1 | 6/2013 |

OTHER PUBLICATIONS

Translation and original KR_20150014877_A (Year: 2015).*
CN109103496A Translation (Year: 2018).*
CN110212152A Translation (Year: 2019).*
Ashwin et al. (Elsevier, 2017, A mass transfer based variable porosity model with particle radius change for a Lithium-ion battery) (Year: 2017).*
International Search Report (PCT/ISA/210) issued in PCT/KR2021/006191, dated Aug. 25, 2021.

* cited by examiner

[FIG. 1]
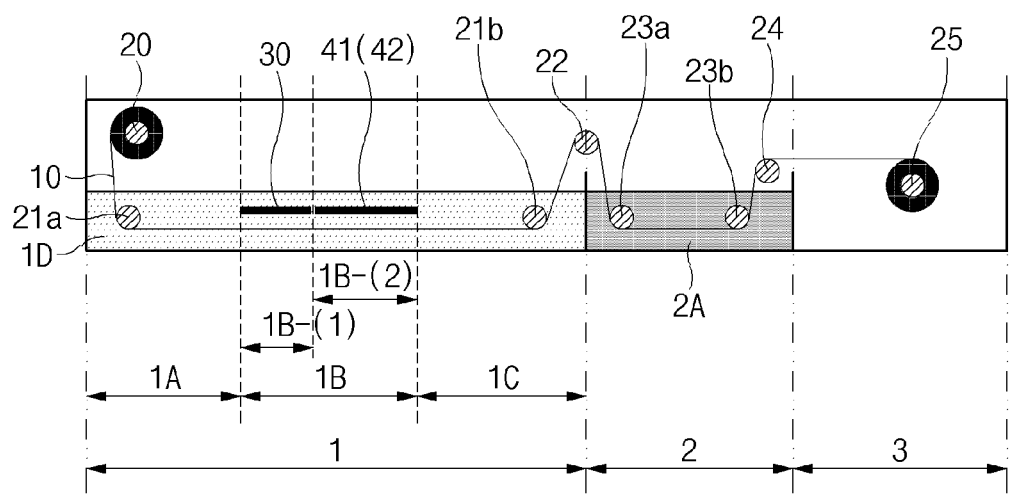
[FIG. 2]
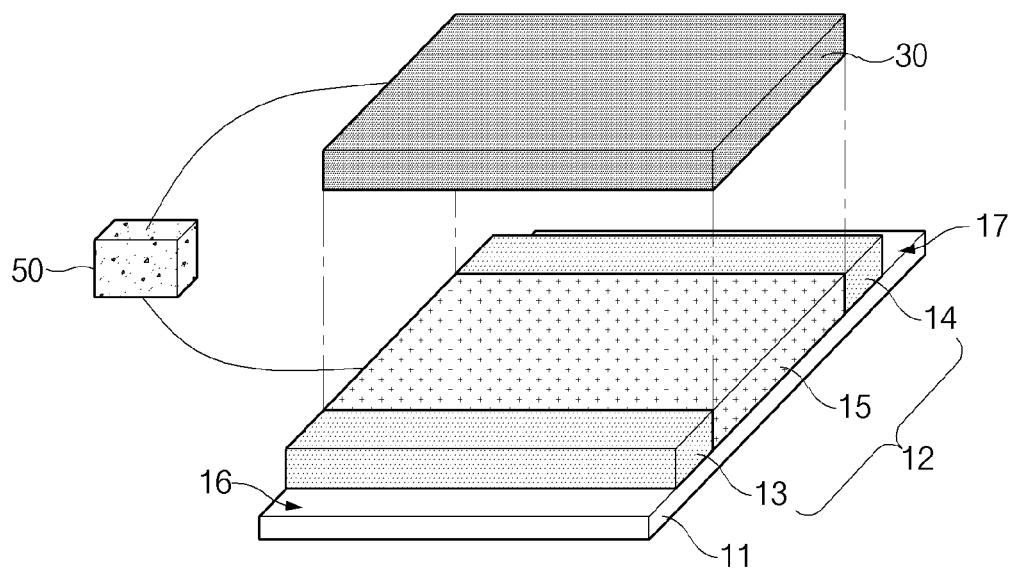

[FIG. 3]
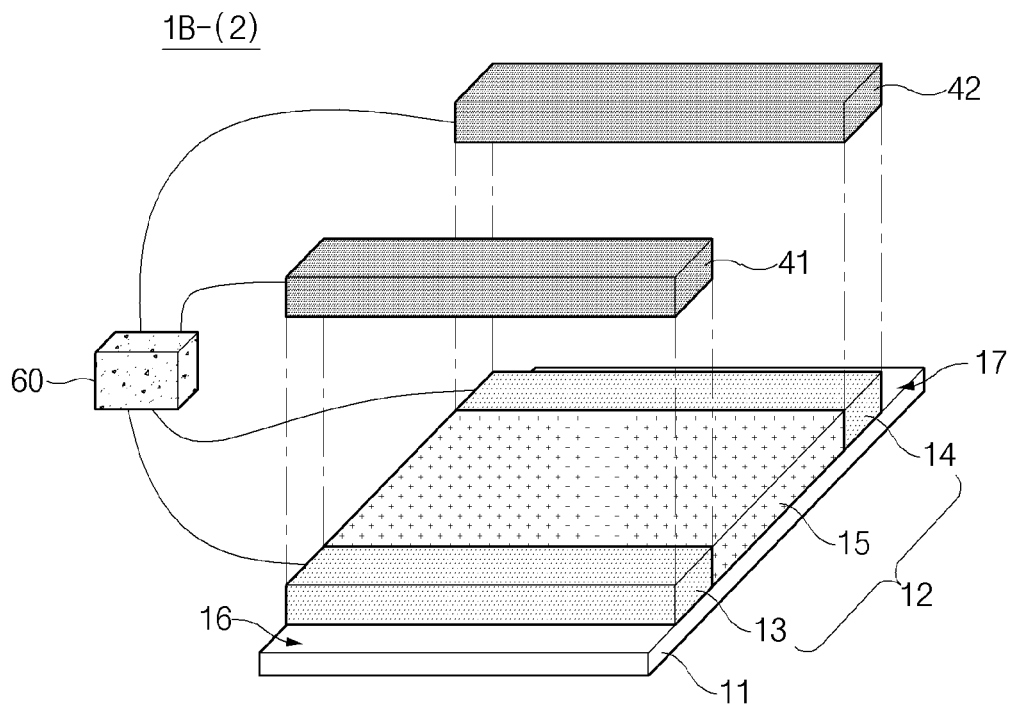
[FIG. 4]
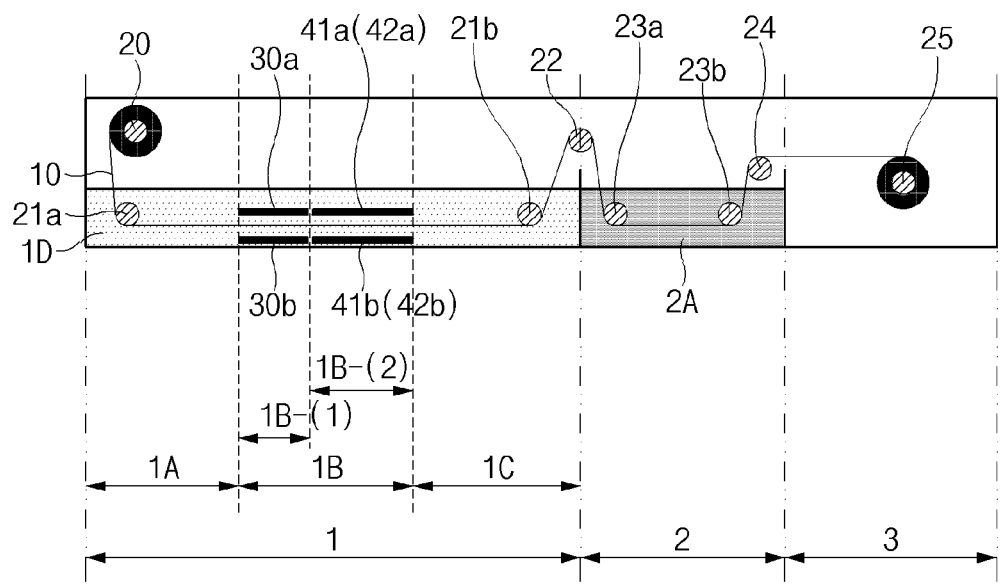

[FIG. 5]
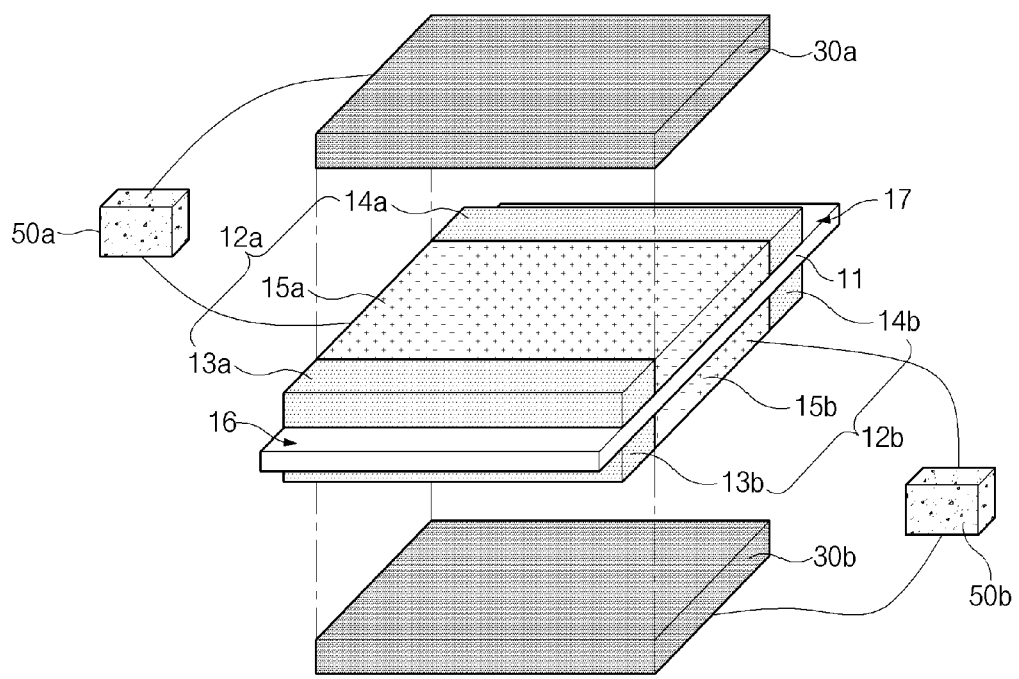

[FIG. 6]
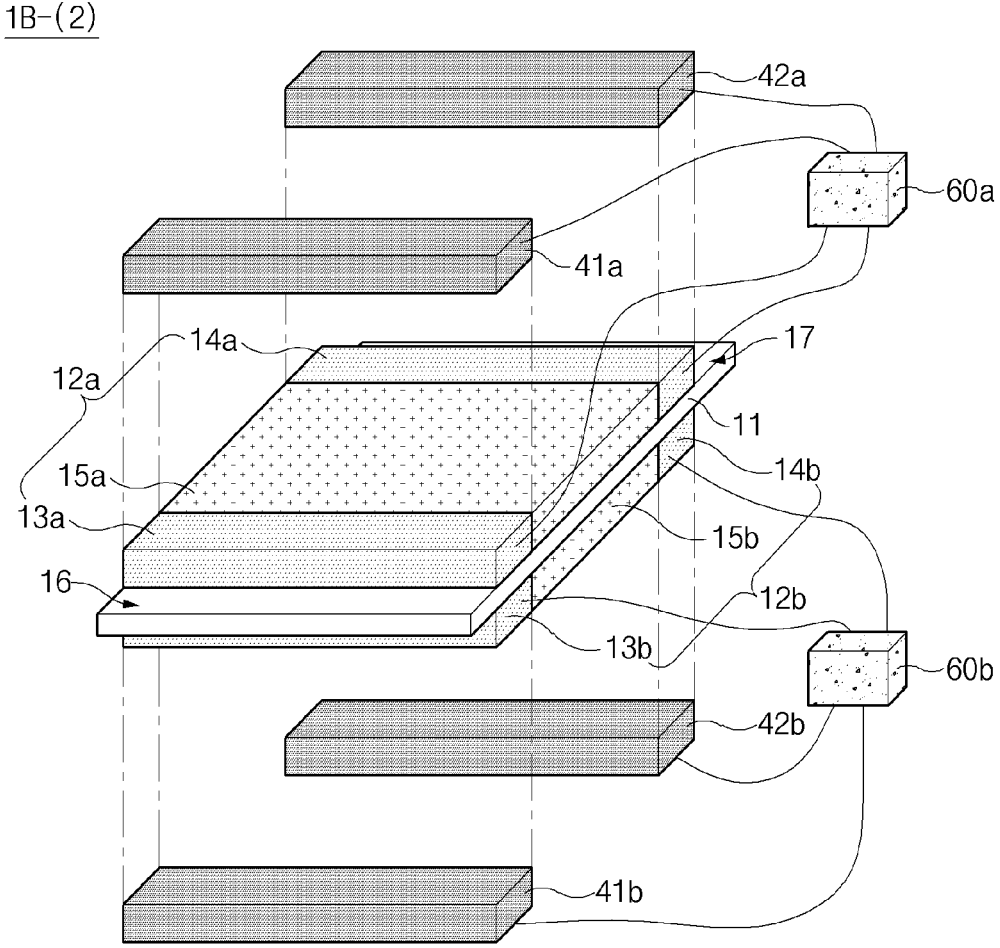

METHOD OF MANUFACTURING NEGATIVE ELECTRODE

CROSS-REFERENCE TO RELATED APPLICATION

This application claims priority to and the benefit of Korean Patent Application No. 10-2020-0059135, filed on May 18, 2020, the disclosure of which is incorporated herein by reference in its entirety.

TECHNICAL FIELD

The present invention relates to a method of manufacturing a negative electrode.

BACKGROUND ART

Recently, in response to the rapid spread of electronic devices using batteries, such as mobile phones, notebook computers, electric vehicles, and the like, demand for secondary batteries having a small size, a light weight, and relatively high capacity is rapidly increasing. Particularly, lithium secondary batteries have been in the spotlight as a driving power source for portable devices due to having a light weight and high energy density. Accordingly, research and development efforts for improving the performance of lithium secondary batteries have been continuously made.

The lithium secondary battery generally includes a positive electrode, a negative electrode, a separator interposed between the positive electrode and the negative electrode, an electrolyte, an organic solvent, and the like. In addition, in the positive electrode and the negative electrode, an active material layer including a positive electrode active material or a negative electrode active material may be formed on a current collector. In general, a lithium-containing metal oxide such as $LiCoO_2$, $LiMn_2O_4$, or the like is used as the positive electrode active material in the positive electrode, and a carbon-based material or a silicon-based material which does not contain lithium is used as the negative electrode active material in the negative electrode.

In the case of such a negative electrode, a passivation film such as a solid electrolyte interface layer (SEI layer) is formed on the surface of the negative electrode during initial charging. Since the passivation film interferes with the insertion of an organic solvent into the negative electrode and suppresses the decomposition reaction of an organic solvent, the aging of the negative electrode structure and the reversibility of the negative electrode are improved, and the negative electrode structure enables use as the negative electrode. However, the formation reaction of the passivation film, which is an irreversible reaction, leads to the consumption of lithium ions, resulting in reduced battery capacity, and as lithium ions are consumed while the battery cycle is repeated, capacity and cycle life are degraded.

Accordingly, a method of performing pre-lithiation by intercalating lithium into the negative electrode to promote the pre-formation of a passivation film on the surface of the negative electrode, the prevention of capacity degradation, and the improvement of cycle life has been developed.

As examples of the pre-lithiation method, a method of bringing a negative electrode structure and a lithium metal into contact to diffuse lithium into the negative electrode structure, a method of introducing a negative electrode structure into a lithium salt-containing solution and electrochemically charging the negative electrode structure using a lithium metal as a counter electrode, and the like are known.

Meanwhile, for mass production of the negative electrode, an attempt has been made to apply the above-described pre-lithiation of the negative electrode in a roll-to-roll process. However, when the negative electrode is allowed to move through roll-to-roll equipment, shaking may occur in the vertical and horizontal directions of the movement direction of the negative electrode, and accordingly, the negative electrode is not uniformly pre-lithiated, or lithium is precipitated on a bare part where a negative electrode active material layer is not formed.

Korean Registered Patent No. 10-0291067 discloses a method of pre-lithiating a carbon electrode and a method of manufacturing a lithium secondary battery using the same.

RELATED-ART DOCUMENTS

Patent Documents

Korean Registered Patent No. 10-0291067

DETAILED DESCRIPTION OF THE INVENTION

Technical Problem

The present invention is directed to providing a method of manufacturing a negative electrode, which allows a negative electrode to be uniformly and stably pre-lithiated in the pre-lithiation of a negative electrode structure including a negative electrode active material layer formed therein in a roll-to-roll manner, improves the quality consistency of a negative electrode, and is capable of improving the initial efficiency and lifetime characteristics of a negative electrode.

Technical Solution

One aspect of the present invention provides a method of manufacturing a negative electrode, which includes: preparing a negative electrode roll on which a negative electrode structure is wound, the negative electrode structure comprising a negative electrode current collector and a negative electrode active material layer on at least one surface of the negative electrode current collector, wherein the negative electrode active material layer comprises side parts partitioned at both sides of the negative electrode active material layer and a central part partitioned by excluding the side parts; preparing a pre-lithiation bath comprising a pre-lithiation solution, wherein the pre-lithiation bath is sequentially divided into an impregnation section and a pre-lithiation section; impregnating the negative electrode structure with the pre-lithiation solution while unwinding the negative electrode structure from the negative electrode roll and moving the negative electrode structure through the impregnation section; and pre-lithiating the negative electrode structure through electrochemical charging while moving the negative electrode structure through the pre-lithiation section, wherein, in the pre-lithiation, the pre-lithiation section comprises a first section and a second section, the central part is electrochemically charged in the first section, the side part is electrochemically charged in the second section, the central part and the side part are alternately electrochemically charged in one or more cycles, and the charge current applied to the central part is higher than the charge current applied to the side part.

Another aspect of the present invention provides a method of manufacturing a negative electrode, which includes:

preparing a negative electrode roll on which a negative electrode structure is wound, the negative electrode structure comprising a negative electrode current collector, a first negative electrode active material layer on one surface of the negative electrode current collector, and a second negative electrode active material layer on the other surface of the negative electrode current collector, wherein the first negative electrode active material layer includes first side parts partitioned at both sides of the first negative electrode active material layer and a first central part partitioned by excluding the first side parts, and the second negative electrode active material layer includes second side parts partitioned at both sides of the second negative electrode active material layer and a second central part partitioned by excluding the second side parts; preparing a pre-lithiation bath comprising a pre-lithiation solution, wherein the pre-lithiation bath is sequentially divided into an impregnation section and a pre-lithiation section; impregnating the negative electrode structure with the pre-lithiation solution while unwinding the negative electrode structure from the negative electrode roll and moving the negative electrode structure through the impregnation section; and pre-lithiating the negative electrode structure through electrochemical charging while moving the negative electrode structure through the pre-lithiation section, wherein, in the pre-lithiation, the pre-lithiation section comprises a first section and a second section, the first central part and the second central part are electrochemically charged in the first section, the first side part and the second side part are electrochemically charged in the second section, the first central part, the first side part, the second central part, and the second side part are sequentially electrochemically charged in one or more cycles in any order, the charge current applied to the first central part is higher than the charge current applied to the first side part, and the charge current applied to the second central part is higher than the charge current applied to the second side part.

Advantageous Effects

A method of manufacturing a negative electrode according to the present invention is characterized in that, in the pre-lithiation of a negative electrode structure including a negative electrode active material layer formed therein through electrochemical charging in a roll-to-roll manner, the negative electrode active material layer is divided into a central part and a side part, and the charge current applied to the central part is higher than the charge current applied to the side part. When the negative electrode structure is allowed to move in a roll-to-roll manner, the shaking of equipment may occur, and accordingly, the side part of the negative electrode active material layer may not be uniformly pre-lithiated, a desired charging amount may not be achieved, or lithium may be precipitated on a bare part where a negative electrode active material layer is not formed. However, according to the method of manufacturing a negative electrode of the present invention, the precipitation of lithium can be minimized by lowering the charge current applied to the side part, and the side part can be sufficiently and uniformly pre-lithiated even when roll-to-roll equipment shakes. Also, side reactions between lithium ions and a pre-lithiation solution (electrolyte solution) can be minimized by increasing the charge current applied to the central part. Therefore, a negative electrode manufactured by the method of manufacturing a negative electrode according to the present invention can exhibit improved quality consistency, and a negative electrode whose initial efficiency and lifetime characteristics are excellent can be manufactured.

In addition, the method of manufacturing a negative electrode according to the present invention is characterized in that a pre-lithiation section is divided into a first section and a second section, the central part is electrochemically charged in the first section, the side part is electrochemically charged in the second section, and the central part and the side part are alternately electrochemically charged in one or more cycles. Since different charge currents are applied to the central part and the side part during electrochemical charging, and the central part and the side part are alternately electrochemically charged in different places, a desired lithium charging amount can be easily achieved. Also, when they are electrochemically charged at the same time, the charge currents applied to the central part and the side part are prevented from interfering with each other, and thus a negative electrode that has been pre-lithiated at a uniform level throughout can be manufactured.

DESCRIPTION OF DRAWINGS

FIG. 1 is a schematic diagram for describing a method of manufacturing a negative electrode according to one example of the present invention.

FIG. 2 is a schematic diagram for describing a method of manufacturing a negative electrode according to one example of the present invention.

FIG. 3 is a schematic diagram for describing a method of manufacturing a negative electrode according to one example of the present invention.

FIG. 4 is a schematic diagram for describing a method of manufacturing a negative electrode according to another example of the present invention.

FIG. 5 is a schematic diagram for describing a method of manufacturing a negative electrode according to another example of the present invention.

FIG. 6 is a schematic diagram for describing a method of manufacturing a negative electrode according to another example of the present invention.

MODES OF THE INVENTION

Terms and words used in this specification and the claims should not be interpreted as limited to commonly used meanings or meanings in dictionaries and should be interpreted with meanings and concepts which are consistent with the technological scope of the present invention based on the principle that the inventors can appropriately define concepts of terms in order to describe the invention in the best way.

The terminology used herein is merely used for the purpose of describing exemplary embodiments, and is not intended to be limiting of the present invention. The singular forms "a," "an," and "the" are intended to include the plural forms as well, unless the context clearly indicates otherwise.

It should be understood that the terms "comprising", "including", and/or "having", when used herein, specify the presence of stated features, integers, steps, operations, elements, components and/or combinations thereof, but do not preclude the presence or addition of one or more other features, integers, steps, operations, elements, components and/or combinations thereof.

In the present invention, an average particle diameter ($D_{50}$) may be defined as a particle diameter corresponding to 50% of the cumulative volume in a particle diameter distribution curve. The average particle diameter ($D_{50}$) may be measured, for example, using a laser diffraction method. The laser diffraction method generally allows the measurement of a particle diameter ranging from a submicron level to several millimeters and may produce a result having high reproducibility and high resolution.

Hereinafter, the present invention will be described in detail.

<Method of Manufacturing Negative Electrode>

The present invention relates to a method of manufacturing a negative electrode, and specifically, to a method of manufacturing a negative electrode for a lithium secondary battery.

The method of manufacturing a negative electrode according to the present invention includes: preparing a negative electrode roll on which a negative electrode structure is wound, the negative electrode structure comprising a negative electrode current collector and a negative electrode active material layer formed on at least one surface of the negative electrode current collector, wherein the negative electrode active material layer comprises side parts partitioned at both sides of the negative electrode active material layer and a central part partitioned by excluding the side parts; preparing a pre-lithiation bath comprising a pre-lithiation solution, wherein the pre-lithiation bath is sequentially divided into an impregnation section and a pre-lithiation section; impregnating the negative electrode structure with the pre-lithiation solution while unwinding the negative electrode structure from the negative electrode roll and moving the negative electrode structure through the impregnation section; and pre-lithiating the negative electrode structure through electrochemical charging while moving the negative electrode structure through the pre-lithiation section, wherein, in the pre-lithiation, the pre-lithiation section comprises a first section and a second section, the central part is electrochemically charged in the first section, the side part is electrochemically charged in the second section, the central part and the side part are alternately electrochemically charged in one or more cycles, and the charge current applied to the central part is higher than the charge current applied to the side part.

When the negative electrode structure is allowed to move through roll-to-roll equipment to pre-lithiate the negative electrode structure through electrochemical charging, the negative electrode structure may be shaken in the vertical and horizontal directions due to the shaking of the roll-to-roll equipment, the fluctuation of the electrolyte solution in the pre-lithiation bath, and the like. The shaking of the negative electrode structure is a factor that hinders the uniform pre-lithiation of the negative electrode structure, and thus it may be difficult to uniformly pre-lithiate the side part of the negative electrode active material layer, a desired level of lithium charging may not be achieved, and lithium may be precipitated on a part where a negative electrode active material layer is not formed on a negative electrode current collector (bare part).

In order to solve the above problems, the method of manufacturing a negative electrode according to the present invention is characterized in that, in the pre-lithiation of a negative electrode structure including a negative electrode active material layer formed therein through electrochemical charging in a roll-to-roll manner, the negative electrode active material layer is divided into a central part and a side part, and the charge current applied to the central part is higher than the charge current applied to the side part. According to the method of manufacturing a negative electrode of the present invention, it is possible to minimize effects caused by the shaking of roll-to-roll equipment, allow the side part to be sufficiently and uniformly pre-lithiated, and prevent the precipitation of lithium on a bare part by lowering the charge current applied to the side part. In addition, side reactions between lithium ions and a pre-lithiation solution (electrolyte solution) can be minimized by increasing the charge current applied to the central part. Therefore, a negative electrode manufactured by the method of manufacturing a negative electrode according to the present invention can exhibit improved quality consistency, and a negative electrode whose initial efficiency and lifetime characteristics are excellent can be manufactured.

In addition, the method of manufacturing a negative electrode according to the present invention is characterized in that a pre-lithiation section is divided into a first section and a second section, the central part is electrochemically charged in the first section, the side part is electrochemically charged in the second section, and the central part and the side part are alternately electrochemically charged in one or more cycles. Since different charge currents are applied to the central part and the side part during electrochemical charging, and the central part and the side part are alternately electrochemically charged in different places, a desired lithium charging amount can be easily achieved. Also, when they are electrochemically charged at the same time, the charging currents applied to the central part and the side part are prevented from interfering with each other, and thus a negative electrode that has been pre-lithiated at a uniform level throughout can be manufactured.

Hereinafter, the method of manufacturing a negative electrode according to the present invention will be described in detail with reference to the accompanying drawings. In giving reference numerals to components of the drawings, it should be noted that the same components have the same reference numerals as much as possible although being shown in different drawings. Further, in the description of embodiments of the present invention, a detailed description of known functions and configurations incorporated herein will be omitted to avoid making the subject matter of the present invention unclear.

FIGS. 1 to 3 are schematic diagrams for describing the method of manufacturing a negative electrode according to one example of the present invention. Specifically, FIG. 1 is a schematic diagram for describing the electrolyte impregnation, pre-lithiation, and the like of the negative electrode structure according to roll-to-roll processing in the method of manufacturing a negative electrode according to one example of the present invention. FIG. 2 is a schematic diagram for describing the electrochemical charging of the central part of the negative electrode active material layer in the first section 1B-(1) of the pre-lithiation section. FIG. 3 is a schematic diagram for describing the electrochemical charging of the side part of the negative electrode active material layer in the second section 1B-(2) of the pre-lithiation section.

<Preparation of Negative Electrode Roll>

The method of manufacturing a negative electrode according to the present invention includes preparing a negative electrode roll on which a negative electrode structure is wound, the negative electrode structure comprising a negative electrode current collector and a negative electrode active material layer formed on at least one surface of the negative electrode current collector is wound, wherein the negative electrode active material layer comprises side parts partitioned at both sides of the negative electrode active material layer and a central part partitioned by excluding the side parts.

According to the method of manufacturing a negative electrode of the present invention, a pre-lithiation process is performed by unwinding a negative electrode structure 10 from a negative electrode roll 20 on which the negative electrode structure 10 has been wound, introducing the negative electrode structure 10 into a pre-lithiation bath 1 to be described below, and moving the same through the pre-lithiation bath 1. In other words, the method of manufacturing a negative electrode according to the present invention is a method of manufacturing a negative electrode in a roll-to-roll manner and has an advantage of improvements in processability and product quality consistency because electrolyte impregnation, pre-lithiation, aging, and the like may be performed at one time while the negative electrode structure 10 moves.

The negative electrode structure 10 is wound on the negative electrode roll 20

The negative electrode roll 20 may be used without any limitation as long as it allows the negative electrode structure 10 to be wound/unwound thereon/therefrom and is typically used in a roll-to-roll process.

The negative electrode structure 10 includes a negative electrode current collector 11 and a negative electrode active material layer 12 formed on at least one surface of the negative electrode current collector 11.

The negative electrode current collector 11 is not particularly limited as long as it does not cause a chemical change in the battery and has high conductivity. Specifically, as the negative electrode current collector, copper, stainless steel, aluminum, nickel, titanium, calcined carbon, copper or stainless steel whose surface has been treated with carbon, nickel, titanium, silver, or the like, an aluminum-cadmium alloy, or the like may be used.

The negative electrode current collector 11 may typically have a thickness of 3 to 500 μm.

The negative electrode current collector 11 may have fine irregularities formed on a surface thereof to increase the adhesion of a negative electrode active material. In addition, the negative electrode current collector may be used in any of various forms such as a film, a sheet, a foil, a net, a porous material, a foam, a non-woven fabric, and the like.

The negative electrode active material layer 12 is formed on at least one surface of the negative electrode current collector 11. The negative electrode active material layer 12 may be formed on one surface or both surfaces of the negative electrode current collector 11.

The negative electrode active material layer 12 may include side parts 13, 14 partitioned at both sides of the negative electrode active material layer 12 and a central part 15 partitioned by excluding the side parts 13, 14. The side part 13, 14 and the central part 15 are partitioned to adjust a charge current to be described below, and each may include some of the negative electrode active material layer 12. In this case, the partition of the side part 13, 14 and the central part 15 does not indicate that a separate boundary is present between the side part and the central part, but is intended to separately describe a region overlapping a first lithium metal counter electrode to be described below in a vertical direction (central part) and a region overlapping a second lithium metal counter electrode to be described below in a vertical direction (side part).

The side parts 13, 14 are partitioned at both sides of the negative electrode active material layer 12 and may be specifically formed to be parallel to the longitudinal direction or movement direction of the negative electrode structure 10 as shown in FIGS. 2 and 3. Specifically, the side parts 13, 14 may be partitioned as two regions at both sides of the negative electrode active material layer 12 as shown in FIGS. 2 and 3.

The width of the side part 13, 14 may be appropriately adjusted in consideration of the occurrence of shaking of roll-to-roll equipment and the like and may specifically range from 0.1 cm to 2 cm, and preferably, 0.3 cm to 1.5 cm.

The central part 15 may be partitioned by excluding the side part 13, 14 in the negative electrode active material layer 12 and may be specifically formed to be parallel to the longitudinal direction or movement direction of the negative electrode structure 10 as shown in FIGS. 2 and 3.

A ratio of widths of the side part 13, 14 and the central part 15 may be 1:5 to 1:100, and preferably, 1:10 to 1:30 in consideration of the occurrence of shaking of roll-to-roll equipment and the like.

As used herein, the "width of a side part" may mean the width of a side part in a direction perpendicular to the longitudinal direction or movement direction of the negative electrode structure, and the "width of a central part" may mean the width of a central part in a direction perpendicular to the longitudinal direction or movement direction of the negative electrode structure.

The negative electrode structure 10 may further include bare parts 16, 17 present at both sides of at least one surface of the negative electrode current collector 11 and not having the negative electrode active material layer 12 thereon. The bare part 16, 17 may be formed in the negative electrode structure, for example, to collect a current in a negative electrode or act as a tab for electrical connection of a positive electrode and a negative electrode. Specifically, as shown in FIG. 2, the side part 13, 14 may be adjacent to the bare part 16, 17, and the central part 15 may be spaced apart from the bare part 16, 17.

The width of the bare part 16, 17 may range from 0.3 cm to 5 cm, and preferably, 1 cm to 2 cm, which is preferred in view of facilitating the electrical connection of electrodes stacked in a secondary battery. As used herein, the "width of a bare part" may mean the width of a bare part in a direction perpendicular to the longitudinal direction or movement direction of the negative electrode structure.

The negative electrode active material layer 12 may include a negative electrode active material.

The negative electrode active material may include at least one selected from among a carbon-based active material and a silicon-based active material.

The silicon-based active material may include a compound represented by $SiO_x$ ($0 \leq x < 2$). Since $SiO_2$ does not react with lithium ions, it is not possible to store lithium. Therefore, it is preferable that x is within the above-described range, and the silicon-based oxide is more preferably SiO.

The silicon-based oxide may have an average particle diameter ($D_{50}$) of 1 μm to 30 μm, and preferably, 2 μm to 15 μm in view of ensuring structural stability and reducing side reactions with an electrolyte during charging and discharging.

The carbon-based active material may include at least one selected from the group consisting of artificial graphite, natural graphite, hard carbon, soft carbon, carbon black, graphene, and fibrous carbon and preferably includes at least one selected from the group consisting of artificial graphite and natural graphite.

The carbon-based active material may have an average particle diameter ($D_{50}$) of 10 μm to 30 μm, and preferably, 15 µm to 25 µm in view of ensuring structural stability and reducing side reactions with an electrolyte during charging and discharging.

Specifically, the negative electrode active material may include both the silicon-based active material and the carbon-based active material in view of improving both capacity characteristics and cycle characteristics. More specifically, the negative electrode active material may include the carbon-based active material and the silicon-based active material in a weight ratio of 50:50 to 95:5, and preferably, in a weight ratio of 60:40 to 80:20. The above-described range is preferred in view of improving both capacity characteristics and cycle characteristics.

The negative electrode active material may be included at 60 wt % to 99 wt %, and preferably, 75 wt % to 95 wt % in the negative electrode active material layer 12.

The negative electrode active material layer 12 may further include a binder and/or a conductive material in addition to the negative electrode active material.

The binder is used to improve adhesion between the negative electrode active material layer and the negative electrode current collector to accordingly improve battery performance. The binder may be, for example, at least one selected from the group consisting of a polyvinylidene fluoride-hexafluoropropylene copolymer (PVDF-co-HFP), polyvinylidene fluoride (PVDF), polyacrylonitrile, polymethyl methacrylate, polyvinyl alcohol, carboxymethylcellulose (CMC), starch, hydroxypropylcellulose, regenerated cellulose, polyvinylpyrrolidone, polytetrafluoroethylene, polyethylene, polypropylene, polyacrylic acid, an ethylene-propylene-diene monomer (EPDM), a sulfonated EPDM, styrene butadiene rubber (SBR), fluorine rubber, polymers in which hydrogens thereof have been substituted with Li, Na, Ca, or the like, and various copolymers thereof.

The binder may be included at 0.5 wt % to 10 wt %, and preferably, 1 wt % to 5 wt % in the negative electrode active material layer 12.

The conductive material is not particularly limited as long as it does not cause a chemical change in the manufactured battery and has conductivity. As the conductive material, graphite such as natural graphite, artificial graphite, or the like; a carbon-based material such as carbon black, acetylene black, Ketjen black, channel black, furnace black, lamp black, thermal black, or the like; a conductive fiber such as carbon fibers, metal fibers, or the like; a conductive tube such as carbon nanotubes or the like; fluorocarbon; a metal powder such as aluminum powder, nickel powder, or the like; a conductive whisker consisting of zinc oxide, potassium titanate, or the like; a conductive metal oxide such as titanium oxide or the like; or a conductive material such as a polyphenylene derivative or the like may be used.

The conductive material may be included at 0.5 wt % to 10 wt %, and preferably, 1 wt % to 5 wt % in the negative electrode active material layer 12.

The negative electrode active material layer 12 may have a thickness of 10 µm to 100 µm, and preferably, 50 µm to 80 µm.

The negative electrode structure may be fabricated by applying a negative electrode slurry including a negative electrode active material, a binder, a conductive material, and/or a solvent for forming a negative electrode slurry onto at least one surface of a negative electrode current collector, followed by drying and roll-pressing.

The solvent for forming a negative electrode slurry may include, for example, at least one selected from the group consisting of distilled water, ethanol, methanol, and isopropyl alcohol, and preferably, distilled water in view of facilitating the dispersion of a negative electrode active material, a binder, and/or a conductive material.

<Preparation of Pre-Lithiation Bath>

The method of manufacturing a negative electrode according to the present invention includes preparing a pre-lithiation bath 1 comprising a pre-lithiation solution 1D, wherein the pre-lithiation bath is sequentially divided into an impregnation section 1A and a pre-lithiation section 1B.

The pre-lithiation bath 1 may be provided as a place where the negative electrode structure 10 unwound from the negative electrode roll 20 may be impregnated with an electrolyte, pre-lithiated, and the like while moving in the pre-lithiation bath.

The size and shape of the pre-lithiation bath 1 may be appropriately designed in consideration of the degrees of the impregnation, pre-lithiation, movement distance of the negative electrode structure according to roll-to-roll processing, or the like. Specifically, a ratio of lengths of the impregnation section 1A and the pre-lithiation section 1B may be 1:1 to 1:20, and preferably, 1.0:1.2 to 1:10 for smoothly performing pre-lithiation. More specifically, in the case of a negative electrode structure in which a negative electrode active material layer is formed on one surface of a negative electrode current collector, a ratio of lengths of the impregnation section 1A and the pre-lithiation section 1B may be 1.0:1.3 to 1:7.5, preferably 1.0:1.4 to 1:4.5, and more preferably 1:3 to 1:4. Even more specifically, in the case of a negative electrode structure in which negative electrode active material layers are formed on both surfaces of a negative electrode current collector, considering that two negative electrode active material layers are alternately electrochemically charged as described below, the length of the pre-lithiation section may slightly increase, and accordingly, a ratio of lengths of the impregnation section 1A and the pre-lithiation section 1B may be 1.0:2.6 to 1.0:15.0, preferably 1.0:2.8 to 1.0:9.0, and more preferably 1:6 to 1:8. As used herein, the "length of an impregnation section 1A" and the "length of a pre-lithiation section 1B" may be lengths set based on the movement direction of the negative electrode structure 10.

The pre-lithiation bath 1 contains the pre-lithiation solution 1D. The pre-lithiation bath 1 is at least partially filled with the pre-lithiation solution 1D, and the negative electrode structure 10 unwound from the negative electrode roll 20 is introduced into the pre-lithiation solution 1D and moves through the sections of the pre-lithiation bath 1.

The pre-lithiation solution 1D may include a lithium salt and an organic solvent.

The organic solvent is not particularly limited as long as it may serve as a medium through which ions involved in an electrochemical reaction can migrate. Specifically, as the organic solvent, an ester-based solvent such as methyl acetate, ethyl acetate, γ-butyrolactone, ε-caprolactone, or the like; an ether-based solvent such as dibutyl ether, tetrahydrofuran, or the like; a ketone-based solvent such as cyclohexanone or the like; an aromatic hydrocarbon-based solvent such as benzene, fluorobenzene, or the like; a carbonate-based solvent such as dimethyl carbonate (DMC), diethyl carbonate (DEC), ethyl methyl carbonate (EMC), ethylene carbonate (EC), propylene carbonate (PC), or the like; an alcohol-based solvent such as ethyl alcohol, isopropyl alcohol, or the like; a nitrile such as R—CN (R is a C2-C20 hydrocarbon group with a linear, branched or cyclic structure and may include a double-bonded aromatic ring or an ether linkage) or the like; an amide such as dimethylformamide or the like; dioxolane such as 1,3-dioxolane or the like; or sulfolane may be used. Among those listed above, a carbonate-based solvent is preferred, and EMC, EC, or the like is more preferred in view of improving electrochemical stability.

The lithium salt may include at least one selected from the group consisting of $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, LiCl, LiI, and $LiB(C_2O_4)_2$ and preferably includes $LiPF_6$.

A concentration of the lithium salt may range from 0.1 M to 3 M, and preferably, 0.5 M to 1.5 M based on the pre-lithiation solution, and the above-described range is preferred because the lithium salt can be sufficiently dissolved so that lithium ions is able to be smoothly intercalated into the active material.

In view of stabilizing the surface of the negative electrode active material to smoothly perform pre-lithiation, the pre-lithiation solution 1D may further include at least one additive selected from the group consisting of fluoroethylene carbonate (FEC), vinylene carbonate (VC), polystyrene (PS), succinonitrile, ethylene glycol bis(propionitrile) ether, and lithium bis(fluorosulfonyl)imide (LiFSI) and preferably further includes FEC.

The additive may be included at 0.1 wt % to 15 wt %, and preferably, 0.5 wt % to 5 wt % with respect to the total weight of the pre-lithiation solution in the pre-lithiation solution in view of stabilizing the surface of the negative electrode active material to smoothly perform pre-lithiation.

The pre-lithiation bath 1 is sequentially divided into the impregnation section 1A and the pre-lithiation section 1B. The impregnation section 1A and the pre-lithiation section 1B are not partitioned in a closed manner in the pre-lithiation bath 1 but abstractly partitioned according to the position of the negative electrode structure in the pre-lithiation bath and the process performed at the position of the negative electrode structure. For example, as shown in FIG. 1, the impregnation section 1A and the pre-lithiation section 1B are abstractly partitioned through a dotted line in the pre-lithiation bath 1.

As the pre-lithiation bath 1 contains the pre-lithiation solution 1D, the pre-lithiation solution 1D is also contained in the impregnation section 1A and the pre-lithiation section 1B which are partitioned in the pre-lithiation bath 1.

In the pre-lithiation bath 1, one or more fixed rolls 21a, 21b may be disposed so that the negative electrode structure 10 unwound from the negative electrode roll 20 may smoothly move through the individual sections 1A, 1B. The fixed rolls 21a, 21b are fixedly disposed in the pre-lithiation bath 1, and the negative electrode structure 10 may move through the individual sections in the pre-lithiation bath 1 along the fixed rolls 21a, 21b. Specifically, as shown in FIG. 1, one or more fixed rolls 21a, 21b may be disposed at both ends of the pre-lithiation bath 1.

The size or length of the impregnation section 1A and the pre-lithiation section 1B may be appropriately designed in consideration of the degrees of electrolyte impregnation, pre-lithiation, and aging of the negative electrode structure 10.

A temperature of the pre-lithiation bath 1 or the pre-lithiation solution 1D may range from 10° C. to 80° C., preferably 20° C. to 60° C., and more preferably 25° C. to 40° C. Within the above-described temperature range, the pre-lithiation of a negative electrode and the diffusion of lithium ions into the negative electrode structure can smoothly proceed.

<Impregnation of Negative Electrode Structure>

The method of manufacturing a negative electrode according to the present invention includes impregnating the negative electrode structure 10 with the pre-lithiation solution 1D while unwinding the negative electrode structure 10 from the negative electrode roll 20 and moving the negative electrode structure 10 through the impregnation section 1A.

The negative electrode structure 10 unwound from the negative electrode roll 20 is introduced into the pre-lithiation bath 1 and moves through the impregnation section 1A. Specifically, as shown in FIG. 1, the negative electrode structure 10 unwound from the negative electrode roll 20 may move through the impregnation section 1A along the fixed rolls 21a, 21b.

As the negative electrode structure 10 moves through the impregnation section 1A, electrolyte impregnation is made by the pre-lithiation solution 1D in the impregnation section 1A. Due to the electrolyte impregnation, lithium ions may be more smoothly intercalated in the pre-lithiation of the negative electrode structure 10.

A ratio of lengths of the impregnation section 1A and the pre-lithiation section 1B may be 1:1 to 1:20, and preferably, 1.0:1.2 to 1:10 for smoothly performing pre-lithiation. Specifically, in the case of a negative electrode structure in which a negative electrode active material layer is formed on one surface of a negative electrode current collector, a ratio of lengths of the impregnation section 1A and the pre-lithiation section 1B may be 1.0:1.3 to 1:7.5, preferably 1.0:1.4 to 1:4.5, and more preferably 1:3 to 1:4. More specifically, in the case of a negative electrode structure in which negative electrode active material layers are formed on both surfaces of a negative electrode current collector, considering that two negative electrode active material layers are alternately electrochemically charged as described below, the length of the pre-lithiation section may slightly increase, and accordingly, a ratio of lengths of the impregnation section 1A and the pre-lithiation section 1B may be 1.0:2.6 to 1.0:15.0, preferably 1.0:2.8 to 1.0:9.0, and more preferably 1:6 to 1:8. Within the above-described range, it is possible to form a more uniform passivation film in pre-lithiation to be described below and perform pre-lithiation.

<Pre-Lithiation of Negative Electrode Structure>

The method of manufacturing a negative electrode according to the present invention includes pre-lithiating the negative electrode structure 10 through electrochemical charging while moving the negative electrode structure 10 through the pre-lithiation section 1B.

The negative electrode structure 10 passes through the impregnation section 1A and enters the pre-lithiation section 1B. While moving through the pre-lithiation section 1B, the negative electrode structure 10 is pre-lithiated, and lithium ions are intercalated into the negative electrode active material layer or negative electrode active material. Accordingly, the irreversible capacity of the negative electrode active material is removed, and a passivation film is formed.

The pre-lithiation may be performed while moving the negative electrode structure 10 through the pre-lithiation section 1B.

In the pre-lithiation, the pre-lithiation section includes a first section 1B-(1) and a second section 1B-(2), the central part 15 is electrochemically charged in the first section 1B-(1), the side part 13, 14 is electrochemically charged in the second section 1B-(2), the central part 15 and the side part 13, 14 are alternately electrochemically charged in one or more cycles in the pre-lithiation section 1B, and the charge current applied to the central part 15 is higher than the charge current applied to the side part 13, 14.

The method of manufacturing a negative electrode according to the present invention is characterized in that, in the pre-lithiation of a negative electrode structure including a negative electrode active material layer formed therein through electrochemical charging in a roll-to-roll manner, the negative electrode active material layer is divided into a central part and a side part, and the charge current applied to the central part is higher than the charge current applied to the side part. According to the method of manufacturing a negative electrode of the present invention, it is possible to minimize effects caused by the shaking of roll-to-roll equipment, allow the side part to be sufficiently and uniformly pre-lithiated, and prevent the precipitation of lithium on a bare part by lowering the charge current applied to the side part. Therefore, a negative electrode whose quality consistency, initial efficiency, and lifetime characteristics are improved can be manufactured.

Specifically, further descriptions are as follows. As described above, roll-to-roll equipment horizontally shakes while momentarily leaving the equilibrium state. When a charge current equal to or higher than that applied to the central part 15 is applied to the side part 13, 14, an excessive amount of lithium ions is transferred to the bare part 16 when roll-to-roll equipment momentarily horizontally shakes, and thus the precipitation of lithium is accelerated. At that time, a sufficient amount of lithium ions is not transferred to the side part 14, and thus a desired pre-lithiation effect may not be achieved.

In addition, when a charge current equal to or higher than that applied to the central part 15 is applied to the side part 13, 14, a larger amount of lithium ions than an amount of lithium ions that the negative electrode active material is able to receive is injected into the side part, and thus high resistance may be applied to the lithium ions that need to migrate to the negative electrode active material present in the side part. Accordingly, lithium may be precipitated on the bare part adjacent to the side part.

Additionally, when a high charge current is applied to the central part 15, there is a concern that high resistance is generated when lithium ions are injected or a possibility that lithium is temporarily precipitated on the central part. However, since the central part 15 is not adjacent to the bare part and the like and has a plurality of negative electrode active materials, lithium ions or precipitated lithium may be transferred to and intercalated into the negative electrode active material adjacent thereto, and thus it is less likely to cause a problem in pre-lithiation. On the contrary, when a low charge current is applied to the central part 15, the possibility of side reactions between lithium ions and the pre-lithiation solution increases, and therefore, it is necessary to apply a slightly high charge current to the central part for smoothly performing pre-lithiation.

Therefore, according to the method of manufacturing a negative electrode of the present invention, lithium ions are not subjected to high resistance in the side part and intercalated into the negative electrode active material by adjusting the charge current applied to the central part to be higher than the charge current applied to the side part, and thus the precipitation of lithium on the bare part may be substantially prevented. Also, since pre-lithiation proceeds with a relatively high charge current in the central part, side reactions between lithium ions and the pre-lithiation solution may be minimized, and thus uniform and stable pre-lithiation is possible throughout.

In addition, in the present invention, even when the shaking of roll-to-roll equipment occurs, only a small amount of lithium ions is transferred to the bare part 16 at the moment of shaking due to a low level of charge current applied to the side part, and thus the possibility of lithium precipitation may be lowered. Also, it is possible to reduce the amount of lithium ions that are not transferred to the side part 14 at the moment of shaking, and as a result, the variation in the degree of pre-lithiation in the negative electrode active material layer may be reduced.

In addition, in the pre-lithiation of the method of manufacturing a negative electrode according to the present invention, the first section 1B-(1) and the second section 1B-(2) are included, the central part 15 is electrochemically charged in the first section 1B-(1), the side part 13, 14 is electrochemically charged in the second section 1B-(2), and the central part 15 and the side part 13, 14 are alternately electrochemically charged in one or more cycles in the pre-lithiation section. In this case, one time of electrochemical charging of the central part 15 and the side part 13, 14 may be defined as one cycle.

For example, when the central part and the side part are charged at the same time with mutually different charge currents in the same or different sections, the charge currents applied to the central part and the side part interfere with each other, and thus desired levels of charge current may not be applied to the central part and the side part.

In addition, for example, even when mutually different charge currents are applied to the central part and the side part, the amounts of lithium finally charged in the central part and the side part need to be the same for uniform pre-lithiation of the negative electrode active material layer, and accordingly, it is necessary that the length of the section required to electrochemically charge the side part is longer than the length of the section required to electrochemically charge the central part. However, when the central part and the side part are alternately charged with mutually different charge currents in the same section without separating sections, as the negative electrode structure continuously moves in roll-to-roll equipment, the central part or the side part are undercharged or overcharged relative to a desired lithium charging amount, and as a result, the uniform pre-lithiation of the negative electrode active material layer is not achieved.

In order to solve the above problem, the method of manufacturing a negative electrode according to the present invention is characterized in that the pre-lithiation section is divided into the first section and the second section, the central part is electrochemically charged in the first section, the side part is electrochemically charged in the second section, and the central part and the side part are alternately electrochemically charged in one or more cycles. Since different charge currents are applied to the central part and the side part during electrochemical charging, and the central part and the side part are alternately electrochemically charged in different places, a desired lithium charging amount may be easily achieved. Also, when they are electrochemically charged at the same time, the charging currents applied to the central part and the side part are prevented from interfering with each other, and thus a negative electrode that has been pre-lithiated at a uniform level throughout may be manufactured.

The lengths of the first section 1B-(1) and the second section 1B-(2) may be adjusted in consideration of the degree of pre-lithiation of the central part 15 and the side part 13, 14. Specifically, since the charge current applied to the side part 13, 14 is lower than the charge current applied to the central part 15, the length of the first section 1B-(1) may be shorter than the length of the second section 1B-(2) in consideration of a balance in the degree of pre-lithiation of the side part 13, 14 and the central part 15. More specifically, a ratio of lengths of the first section 1B-(1) and the second section 1B-(2) may be 1:1.2 to 1:15, preferably 1:3 to 1:8, and more preferably 1:5 to 1:7.

In the pre-lithiation, a first lithium metal counter electrode 30 is faces and is spaced apart from the central part 15 of the negative electrode active material layer in the first section 1B-(1), a second lithium metal counter electrode 41, 42 faces and is spaced apart from the side part 13, 14 of the negative electrode active material layer in the second section 1B-(2), the first lithium metal counter electrode 30 and the negative electrode structure 10 are connected to each other through a first electrochemical charger/discharger 50, the second lithium metal counter electrode 41, 42 and the negative electrode structure 10 are connected to each other through a second electrochemical charger/discharger 60, and the pre-lithiation may be performed by a method including setting the charge current applied from the first electrochemical charger/discharger 50 to be higher than the charge current applied from the second electrochemical charger/discharger 60 and alternately electrochemically charging the central part 15 and the side part 13, 14 in one or more cycles while alternately operating the first electrochemical charger/discharger 50 and the second electrochemical charger/discharger 60.

As shown in FIGS. 2 and 3, the first section 1B-(1) may be provided to pre-lithiate the central part 15 of the negative electrode active material layer through electrochemical charging, and the second section 1B-(2) may be provided to pre-lithiate the side part 13, 14 of the negative electrode active material layer through electrochemical charging. The first section 1B-(1) and the second section 1B-(2) may be partitioned in the pre-lithiation section 1B and disposed in any order. Specifically, the first section 1B-(1) and the second section 1B-(2) may be sequentially disposed or partitioned as shown in FIG. 1.

The first lithium metal counter electrode 30 may be disposed in the first section 1B-(1), and the second lithium metal counter electrode 41, 42 may be disposed in the second section 1B-(2). The first lithium metal counter electrode 30 and the second lithium metal counter electrode 41, 42 may be disposed in the pre-lithiation section 1B and specifically immersed in the pre-lithiation solution in the pre-lithiation section 1B.

The first lithium metal counter electrode 30 may function as a counter electrode for the central part 15 of the negative electrode active material layer, and the second lithium metal counter electrode 41, 42 may function as a counter electrode for the side part 13, 14 of the negative electrode active material layer.

The first lithium metal counter electrode 30 may be disposed to face the central part 15 of the negative electrode active material layer and to be spaced apart from the central part 15 of the negative electrode active material layer to prevent an electrode short phenomenon resulting from direct contact with the central part 15 of the negative electrode active material layer during electrochemical charging. In addition, the second lithium metal counter electrode 41, 42 may be disposed to face the side part 13, 14 of the negative electrode active material layer and to be spaced apart from the side part 13, 14 of the negative electrode active material layer.

When a conventional pre-lithiation method, in which a lithium metal and a negative electrode structure are in direct contact, is applied in a roll-to-roll process, both a negative electrode structure and a lithium metal need to be wound on a negative electrode roll. In this case, it is not possible to adjust an intercalation rate of lithium ions, and thus a negative electrode active material may be damaged, causing the lifetime characteristics of the negative electrode active material to be degraded. When a process of contacting a lithium metal with a negative electrode structure and compressing them is separately performed without winding both a negative electrode structure and a lithium metal on a negative electrode roll, it is not possible to perform electrolyte impregnation, pre-lithiation, and aging processes at one time as in the present invention, and thus there is a great deal of inconvenience in the process. However, the method of manufacturing a negative electrode according to the present invention makes it possible to adjust an intercalation rate of lithium ions and prevent the volume expansion of or damage to a negative electrode active material due to excessive lithium intercalation by performing pre-lithiation through an electrochemical charging method using a lithium metal spaced apart from the negative electrode structure as a counter electrode, as compared with the conventional method in which a negative electrode structure and a lithium metal are in direct contact.

The first lithium metal counter electrode 30 may be spaced apart from the central part 15 of the negative electrode active material layer by 1 mm to 30 mm, and preferably, 3 mm to 15 mm. The second lithium metal counter electrode 41, 42 may be spaced apart from the side part 13, 14 of the negative electrode active material layer by 1 mm to 30 mm, and preferably, 3 mm to 15 mm. Within the above-described ranges, lithium can be smoothly intercalated into the negative electrode active material layer, and an electrode short phenomenon that may occur as the separation distance becomes excessively narrow can be prevented.

The length of the first lithium metal counter electrode 30 may be the same as the length of the first section 1B-(1), and the length of the second lithium metal counter electrode 41, 42 may be the same as the length of the second section 1B-(2). Specifically, a ratio of lengths of the first lithium metal counter electrode 30 and the second lithium metal counter electrode 41, 42 may be 1:1.2 to 1:15, preferably 1:3 to 1:8, and more preferably 1:5 to 1:7.

In the specification, the lengths of the first section 1B-(1), the second section 1B-(2), the first lithium metal counter electrode 30, and the second lithium metal counter electrode 41, 42 may be based on a direction parallel to the movement direction or longitudinal direction of the negative electrode structure.

The first lithium metal counter electrode 30 and the negative electrode structure 10 may be electrically connected to each other through the first electrochemical charger/discharger 50, and the second lithium metal counter electrode 41, 42 and the negative electrode structure 10 may be electrically connected to each other through the second electrochemical charger/discharger 60.

The first electrochemical charger/discharger 50 provides an oxidation current to the first lithium metal counter electrode 30 to oxidize lithium into lithium ions and provides a reduction current to the central part 15 of the negative electrode active material layer to intercalate the lithium ions derived from the first lithium metal counter electrode 30 into the central part 15 of the negative electrode active material layer, thereby electrochemical charging the central part. In addition, the second electrochemical charger/discharger 60 provides an oxidation current to the second lithium metal counter electrode 41, 42 to oxidize lithium into lithium ions and provides a reduction current to the side part 13, 14 of the negative electrode active material layer to intercalate the lithium ions derived from the second lithium metal counter electrode 41, 42 into the side part 13, 14 of the negative electrode active material layer, thereby electrochemically charging the side parts.

In the pre-lithiation, each of the central part 15 and the side part 13, 14 may be electrochemically charged for 0.1 seconds to 80 seconds, preferably 0.5 seconds to 50 seconds, more preferably 0.8 seconds to 15 seconds, and even more preferably 3 seconds to 7 seconds in one cycle. The above-described range is preferred because a current can be stably supplied to the central part and the side part, and a problem that a current is not stably applied due to resistance as the cycle is too short and a problem that lithium ions are locally intercalated into one side of the negative electrode active material layer as the cycle is too long can be resolved.

The charge current applied to the side part 13, 14 may be 0.04 times to 0.7 times, preferably 0.08 times to 0.3 times, and more preferably 0.1 times to 0.2 times the charge current applied to the central part. The above-described range is preferred because side reactions caused by the excessively low charge current of the side part can be prevented, and the precipitation of lithium on the bare part and the non-uniform pre-lithiation of the side part caused by the excessively high charge current of the side part can be prevented.

The charge current applied to the side part 13, 14 may be 0.4 mA/cm$^2$ to 7 mA/cm$^2$, preferably 0.5 mA/cm$^2$ to 5 mA/cm$^2$, and more preferably 1 mA/cm$^2$ to 2 mA/cm$^2$. Within the above-described range, the side part 13, 14 of the negative electrode active material layer can be uniformly and sufficiently pre-lithiated, side reactions caused by the excessively low charge current can be prevented, and problems such as the formation of overvoltage of the negative electrode active material due to a high current and an increase in resistance that is applied to lithium ions can be prevented, thereby substantially preventing the precipitation of lithium on the bare part.

The charge current applied to the central part 15 may be 8 mA/cm$^2$ to 15 mA/cm$^2$, and preferably, 9 mA/cm$^2$ to 12 mA/cm$^2$. The above-described range is preferred because the central part can be stably and quickly pre-lithiated.

In the pre-lithiation, the central part 15 of the negative electrode active material layer may be electrochemically charged to state of charge (SOC) 5% to SOC 50%, and preferably, SOC 15% to SOC 35%. The side part 13, 14 of the negative electrode active material layer may be electrochemically charged to SOC 5% to SOC 50%, and preferably, SOC 15% to SOC 35%. It is preferable that pre-lithiation proceeds by electrochemical charging within the above-described SOC range because a passivation film can be uniformly and stably formed on the surface of the negative electrode structure, and thus the reversible capacity of a battery can be improved, thereby improving the cycle characteristics of a battery. As used herein, the SOC means the state of charge of a negative electrode active material layer, and for example, SOC 100% means that the negative electrode active material layer is fully charged, SOC 0% means that the negative electrode active material layer is fully discharged, and SOC x % (0≤x≤100) means that the negative electrode active material layer is charged x % relative to SOC 100%. Meanwhile, the central part 15 and side part 13, 14 of the negative electrode active material layer may be electrochemically charged to the same SOC.

<Aging of Negative Electrode Structure>

In the method of manufacturing a negative electrode according to the present invention, the pre-lithiation bath 1 may be sequentially divided into the impregnation section 1A, the pre-lithiation section 1B, and an aging section 1C. That is, as shown in FIG. 1, in the pre-lithiation bath, the aging section 1C may be further partitioned in addition to the impregnation section 1A and the pre-lithiation section 1B.

The method of manufacturing a negative electrode according to the present invention may further include aging the negative electrode structure 10 while moving the negative electrode structure 10 from the pre-lithiation section 1B to the aging section 1C.

While the negative electrode structure 10 moving from the pre-lithiation section 1B to the aging section 1C moves through the aging section 1C containing a pre-lithiation solution 1D, the lithium ions intercalated by the pre-lithiation may be more uniformly diffused on the surface and in the inside of the negative electrode active material, and the irreversible capacity of the negative electrode active material may be sufficiently removed.

The aging section 1C may not be partitioned in a closed manner with respect to the impregnation section 1A and the pre-lithiation section 1B in the pre-lithiation bath 1 but abstractly partitioned according to the position of the negative electrode structure in the pre-lithiation bath 1 and the process performed at the position of the negative electrode structure.

As the pre-lithiation bath 1 contains the pre-lithiation solution 1D, the pre-lithiation solution 1D is also contained in the aging section 1C which is partitioned in the pre-lithiation bath 1. Descriptions about the composition of the pre-lithiation solution and the like have been described above.

The aging section 1C may include one or more fixed rolls so that the negative electrode structure unwound from the negative electrode roll 20 may smoothly move through the aging section.

A ratio of lengths of the pre-lithiation section 1B and the aging section 1C may be 1:1 to 20:1, and preferably, 1.0:1.2 to 1:10. Specifically, in the case of a negative electrode structure in which a negative electrode active material layer is formed on one surface of a negative electrode current collector, a ratio of lengths of the pre-lithiation section 1B and the aging section 1C may be 7.5:1.0, preferably 1.4:1.0 to 4.5:1.0, and more preferably 3:1 to 4:1. More specifically, in the case of a negative electrode structure in which negative electrode active material layers are formed on both surfaces of a negative electrode current collector, considering that two negative electrode active material layers are alternately electrochemically charged as described below, the length of the pre-lithiation section may slightly increase, and a ratio of lengths of the pre-lithiation section 1B and the aging section 1C may be 2.6:1.0 to 15.0:1.0, preferably 2.8:1.0 to 9.0:1.0, and more preferably 6:1 to 8:1. The above-described range is preferred because lithium ions can be more uniformly diffused in the inside of the negative electrode active material, and the detachment of the negative electrode active material layer from the current collector due to excessive aging or an increase in resistance due to an increase in thickness of a surface coating of a negative electrode can be prevented.

<Washing of Negative Electrode Structure>

The method of manufacturing a negative electrode according to the present invention may further include washing the pre-lithiated negative electrode structure 10 by taking the pre-lithiated negative electrode structure 10 out of the pre-lithiation bath 1, introducing the same into a washing bath 2 comprising an organic solvent, and moving the same through the washing bath 2.

The negative electrode structure 10 may move from the pre-lithiation bath 1 to the washing bath 2 after passing through the pre-lithiation section 1B or move from the pre-lithiation bath 1 to the washing bath 2 after passing through the aging section 1C.

Since the method of manufacturing a negative electrode according to the present invention further includes a process of washing the negative electrode structure 10 after the pre-lithiation or pre-lithiation and aging of the negative electrode structure 10, impurities remaining in the negative electrode structure may be removed.

Specifically, the washing process may be performed by discharging the negative electrode structure 10 from the pre-lithiation bath 1 and introducing the same into the washing bath 2 through a fixed roll 22 disposed between the pre-lithiation bath 1 and the washing bath 2, and the negative electrode structure 10 may be washed while moving through the washing bath 2. The movement of the negative electrode structure 10 through the washing bath 2 may proceed by separately arranged fixed rolls 23a, 23b.

The washing bath 2 comprises an organic solvent 2A, specifically, an organic solvent not containing a lithium salt. The washing process is performed while the negative electrode structure moves in the organic solution not containing a lithium salt. As the organic solvent, the organic solvent listed in the description of the pre-lithiation solution may be used.

A ratio of lengths of the pre-lithiation section 1B and the washing bath 2 may be 2:1 to 35:1, and preferably, 2.7:1.0 to 10.0:1.0. Specifically, in the case of a negative electrode structure in which a negative electrode active material layer is formed on one surface of a negative electrode current collector, a ratio of lengths of the pre-lithiation section 1B and the washing bath 2 may be 2.6:1.0 to 15.0:1.0, preferably 2.8:1.0 to 9.0:1.0, and more preferably 6:1 to 8:1. More specifically, in the case of a negative electrode structure in which negative electrode active material layers are formed on both surfaces of a negative electrode current collector, considering that two negative electrode active material layers are alternately electrochemically charged as described below, the length of the pre-lithiation section may slightly increase, and a ratio of lengths of the pre-lithiation section 1B and the washing bath 2 may be 5.2:1.0 to 30.0:1.0, preferably 5.6:1.0 to 18.0:1.0, and more preferably 12:1 to 16:1. Within the above-described range, impurities remaining in the negative electrode structure can be smoothly removed.

The method of manufacturing a negative electrode according to the present invention may further include drying the washed negative electrode structure 10.

Through the drying process, the organic solvent remaining in the negative electrode structure after the impregnation, pre-lithiation, aging, and/or washing processes may be removed.

Specifically, the drying process may be performed by taking the washed negative electrode structure 10 out of the washing bath 2, introducing the same into a separately arranged drying part 3, and moving the same through the drying part 3. A fixed roll 24 may be disposed between the washing bath 2 and the drying part 3, and the negative electrode structure 10 may move along the fixed roll 24.

The drying process may be performed by air or an inert gas. The inert gas may be at least one selected from the group consisting of Ar, $N_2$, and He.

The drying process may be performed at 10° C. to 80° C., and preferably, 20° C. to 60° C. The above-described temperature range is preferred in view of preventing the oxidation of the negative electrode structure and maintaining the pre-lithiated state.

A ratio of the time taken for the negative electrode structure 10 to move through the pre-lithiation section and the time taken for the washed negative electrode structure 10 to be dried may be 2:1 to 35:1, and preferably, 2.7:1.0 to 10.0:1.0. Specifically, in the case of a negative electrode structure in which a negative electrode active material layer is formed on one surface of a negative electrode current collector, a ratio of the time taken to move through the pre-lithiation section and the time taken for the washed negative electrode structure 10 to be dried may be 2.6:1.0 to 15.0:1.0, preferably 2.8:1.0 to 9.0:1.0, and more preferably 6:1 to 8:1. More specifically, in the case of a negative electrode structure in which negative electrode active material layers are formed on both surfaces of a negative electrode current collector, considering that two negative electrode active material layers are alternately electrochemically charged as described below, the length of the pre-lithiation section may slightly increase, and a ratio of the time taken to move through the pre-lithiation section and the time taken for the washed negative electrode structure 10 to be dried may be 5.2:1.0 to 30.0:1.0, preferably 5.6:1.0 to 18.0:1.0, and more preferably 12:1 to 16:1. The above-described range is preferred because the organic solvent remaining in the negative electrode structure can be smoothly removed, and damage to the negative electrode structure which may be caused by the organic solvent remaining in the negative electrode structure for a long time can be prevented.

In the drying part 3, a collecting roll 25 may be installed, and the negative electrode structure 10 that has moved through the drying part 3 may be wound on the collecting roll 25.

The method of manufacturing a negative electrode according to the present invention may further include manufacturing a negative electrode by unwinding the negative electrode structure 10 from the collecting roll 25 and cutting the same.

The negative electrode may be assembled with a positive electrode, a separator, an electrolyte, and the like as described below, and accordingly, a secondary battery, specifically a lithium secondary battery, may be manufactured.

In addition, there is provided a method of manufacturing a negative electrode according to another embodiment of the present invention.

Specifically, the method of manufacturing a negative electrode according to another embodiment of the present invention includes: preparing a negative electrode roll on which a negative electrode structure is wound, the negative electrode structure comprising a negative electrode current collector, a first negative electrode active material layer formed on one surface of the negative electrode current collector, and a second negative electrode active material layer formed on the other surface of the negative electrode current collector, wherein the first negative electrode active material layer comprises first side parts partitioned at both sides of the first negative electrode active material layer and a first central part partitioned by excluding the first side parts, and the second negative electrode active material layer comprises second side parts partitioned at both sides of the second negative electrode active material layer and a second central part partitioned by excluding the second side parts; preparing a pre-lithiation bath comprising a pre-lithiation solution, wherein the pre-lithiation bath is sequentially divided into an impregnation section and a pre-lithiation section; impregnating the negative electrode structure with the pre-lithiation solution while unwinding the negative electrode structure from the negative electrode roll and moving the negative electrode structure through the impregnation section; and pre-lithiating the negative electrode structure through electrochemical charging while moving the negative electrode structure through the pre-lithiation section, wherein, in the pre-lithiation, the pre-lithiation section comprises a first section and a second section, the first central part and the second central part are electrochemically charged in the first section, the first side part and the second side part are electrochemically charged in the second section, the first central part, the first side part, the second central part, and the second side part are sequentially electrochemically charged in one or more cycles in any order, the charge current applied to the first central part is higher than the charge current applied to the first side part, and the charge current applied to the second central part is higher than the charge current applied to the second side part.

FIGS. 4 to 6 are schematic diagrams for describing the method of manufacturing a negative electrode according to another embodiment of the present invention. Specifically, FIG. 4 is a schematic diagram for describing the electrolyte impregnation, pre-lithiation, and the like of the negative electrode structure according to roll-to-roll processing in the method of manufacturing a negative electrode according to another example of the present invention. FIG. 5 is a schematic diagram for describing the electrochemical charging of the central part of the negative electrode active material layer in the first section 1B-(1) of the pre-lithiation section. FIG. 6 is a schematic diagram for describing the electrochemical charging of the side part of the negative electrode active material layer in the second section 1B-(2) of the pre-lithiation section.

Specifically, referring to FIGS. 4 to 6, a negative electrode structure 10 is wound on a negative electrode roll 20. In addition, the negative electrode structure 10 includes a negative electrode current collector 11, a first negative electrode active material layer 12a formed on one surface of the negative electrode current collector 11, and a second negative electrode active material layer 12b formed on the other surface of the negative electrode current collector 11, the first negative electrode active material layer 12a includes first side parts 13a, 14a partitioned at both sides of the first negative electrode active material layer 12a and a first central part 15a partitioned by excluding the first side parts 13a, 14a, and the second negative electrode active material layer 12b includes second side parts 13b, 14b partitioned at both sides of the second negative electrode active material layer 12b and a second central part 15b partitioned by excluding the second side parts 13b, 14b.

The first negative electrode active material layer 12a and the second negative electrode active material layer 12b; the first side part 13a, 14a and the second side part 13b, 14b; and the first central part 15a and the second central part 15b may be the same as the negative electrode active material layer 12; the side part 13, 14; and the central part 15 described with reference to FIGS. 1 to. 3, respectively.

In addition, the method of manufacturing a negative electrode according to another embodiment of the present invention includes: preparing a pre-lithiation bath 1 which is sequentially divided into an impregnation section 1A and a pre-lithiation section 1B and contains a pre-lithiation solution 1D; impregnating the negative electrode structure 10 with the pre-lithiation solution 1D while unwinding the negative electrode structure 10 from the negative electrode roll 20 and moving the negative electrode structure 10 through the impregnation section 1A; and pre-lithiating the negative electrode structure 10 through electrochemical charging while moving the negative electrode structure 10 through the pre-lithiation section 1B.

In this case, descriptions about the pre-lithiation bath 1, the impregnation section 1A, the pre-lithiation section 1B, and the pre-lithiation solution 1D may be the same as those about the pre-lithiation bath 1, the impregnation section 1A, the pre-lithiation section 1B, and the pre-lithiation solution 1D described with reference to FIGS. 1 to 3.

In the pre-lithiation, the pre-lithiation section 1B includes a first section 1B-(1) and a second section 1B-(2), the first central part 15a and the second central part 15b are electrochemically charged in the first section 1B-(1), the first side part 13a, 14a and the second side part 13b, 14b are electrochemically charged in the second section 1B-(2), the first central part 15a, the first side part 13a, 14a, the second central part 15b, and the second side part 13b, 14b are sequentially electrochemically charged in one or more cycles in any order, the charge current applied to the first central part 15a is higher than the charge current applied to the first side part 13a, 14a, and the charge current applied to the second central part 15b is higher than the charge current applied to the second side part 13b, 14b.

For example, when two lithium metal counter electrodes are disposed to be spaced apart from two negative electrode active material layers in the negative electrode structure, respectively, and the two negative electrode active material layers are pre-lithiated through simultaneously electrochemical charging, the separation distances between the two negative electrode active material layers and the two lithium metal counter electrodes may differ due to the shaking of the negative electrode structure in roll-to-roll equipment. The difference in separation distance allows a negative electrode active material layer closer to a lithium metal counter electrode to form lower resistance to lithium ion migration as compared to a negative electrode active material layer far from a lithium metal counter electrode, and accordingly, lithium ions may be locally intercalated into a negative electrode active material layer closer to a lithium metal counter electrode. This causes the non-uniform pre-lithiation of two negative electrode active material layers and the distortion of the negative electrode structure resulting therefrom and degrades the quality consistency of a negative electrode, thereby degrading the initial efficiency and lifetime characteristics of a negative electrode.

In addition, when negative electrode active material layers are formed on both surfaces of the negative electrode structure, one of the two negative electrode active material layers is first pre-lithiated, and the other negative electrode active material layer is then pre-lithiated, it may be difficult to uniformly and stably pre-lithiate the other negative electrode active material layer due to the volume expansion of the firstly pre-lithiated negative electrode active material layer and the deformation of a negative electrode, resulting in worsening the non-uniform pre-lithiation of the two negative electrode active material layers.

However, according to the method of manufacturing a negative electrode according to the present invention, the first central part and first side part of the first negative electrode active material layer and the second central part and second side part of the second negative electrode active material layer are pre-lithiated through sequential electrochemical charging in one or more cycles in any order. Therefore, as described above, the central part and side part in one negative electrode active material layer may be pre-lithiated at uniform levels without lithium precipitation, and simultaneously, the first negative electrode active material layer and the second negative electrode active material layer may be alternately electrochemically charged, and as a result, two negative electrode active material layers are pre-lithiated at the same levels, and uniform and stable pre-lithiation is possible.

Specifically, according to the present invention, for example, when the first negative electrode active material layer (first central part or first side part) is electrochemically charged, the second negative electrode active material layer (second central part or second side part) is not electrochemically charged, and thus lithium ions in the pre-lithiation solution may be directed toward and intercalated into the first negative electrode active material layer by the electrochemical charging, and may not be intercalated into the second negative electrode active material layer. When the second negative electrode active material layer is electrochemically charged, lithium ions in the pre-lithiation solution may be directed toward and intercalated into the second negative electrode active material layer, and may not be intercalated into the first negative electrode active material layer. Therefore, according to the present invention, the first negative electrode active material layer and the second negative electrode active material layer do not undergo the degradation of lithium ion migration caused by the difference in separation distance from the lithium metal counter electrodes, and thus non-uniform pre-lithiation resulting therefrom may not occur.

In addition, for example, when only the first negative electrode active material layer is electrochemically charged, the separation distance between the lithium metal counter electrode and the first negative electrode active material layer may vary due to the shaking of the negative electrode structure in roll-to-roll equipment. However, according to the present invention, electrons formed by oxidation of the lithium metal counter electrode are transferred to lithium salts in the pre-lithiation solution, and thus lithium ions in the pre-lithiation solution, which is present near the first negative electrode active material layer, may be intercalated into the first negative electrode active material layer. Therefore, even when the separation distance between the first negative electrode active material layer and the lithium metal counter electrode varies, the amount of lithium ions intercalated may be adjusted equally.

Therefore, according to the present invention, non-uniform and unstable pre-lithiation caused by the shaking of the negative electrode structure in roll-to-roll equipment may be prevented, the non-uniformity caused by a difference in amount of lithium ions intercalated into two negative electrode active material layers in the pre-lithiation process may be resolved, two negative electrode active material layers formed on both surfaces of the negative electrode structure may be equally and uniformly pre-lithiated, and the structural deformation of a negative electrode may be prevented, thereby substantially improving the quality consistency of a negative electrode and manufacturing a negative electrode whose initial efficiency and lifetime characteristics are improved.

In another embodiment of the present invention, one cycle may mean that the first central part, the first side part, the second central part, and the second side part are sequentially electrochemically charged once in any order.

In one cycle, each of the first central part, the first side part, the second central part, and the second side part is electrochemically charged for 0.1 seconds to 80 seconds, preferably 0.5 seconds to 50 seconds, more preferably 0.8 seconds to 15 seconds, and even more preferably 3 seconds to 7 seconds. The above-described range is preferred because a current can be stably supplied to two negative electrode active material layers, and a problem that a current is not stably applied due to resistance as the cycle is too short and a problem that lithium ions are locally intercalated into one side of the negative electrode active material layer as the cycle is too long can be resolved.

Specifically, the charging order of the first central part, the first side part, the second central part, and the second side part is not particularly limited. For example, the first central part, the second central part, the first side part, and the second side part may be sequentially electrochemically charged in one or more cycles.

Specifically, a 1-1 lithium metal counter electrode 30a disposed to face and be spaced apart from the central part 15a of the first negative electrode active material layer 12a and a 1-2 lithium metal counter electrode 30b disposed to face and be spaced apart from the central part 15b of the second negative electrode active material layer 12b are disposed in the first section 1B-(1), and a 2-1 lithium metal counter electrode 41a, 42a disposed to face and be spaced apart from the side part 13a, 14a of the first negative electrode active material layer 12a and a 2-2 lithium metal counter electrode 41b, 42b disposed to face and be spaced apart from the side part 13b, 14b of the second negative electrode active material layer 12b are disposed in the second section 1B-(2). Also, the central part 15a of the first negative electrode active material layer 12a and the 1-1 lithium metal counter electrode 30a are connected to each other through a 1-1 electrochemical charger/discharger 50a, the side part 13a, 14a of the first negative electrode active material layer 12a and the 2-1 lithium metal counter electrode 41a, 42a are connected to each other through a 2-1 electrochemical charger/discharger 60a, the central part 15b of the second negative electrode active material layer 12b and the 1-2 lithium metal counter electrode 30b are connected to each other through a 1-2 electrochemical charger/discharger 50b, and the side part 13b, 14b of the second negative electrode active material layer 12b and the 2-2 lithium metal counter electrode 41b, 42b are connected to each other through a 2-2 electrochemical charger/discharger 60b. Also, the pre-lithiation may be performed by a method including setting the charge current applied from the 1-1 electrochemical charger/discharger 50a to be higher than the charge current applied from the 2-1 electrochemical charger/discharger 60a, setting the charge current applied from the 1-2 electrochemical charger/discharger 50b to be higher than the charge current applied from the 2-2 electrochemical charger/discharger 60b, and electrochemically charging the first central part 15a, the first side part 13a, 14a, the second central part 15b, and the second side part 13b, 14b in one or more cycles while sequentially operating the 1-1 electrochemical charger/discharger 50a, the 2-1 electrochemical charger/discharger 60a, the 1-2 electrochemical charger/discharger 50b, and the 2-2 electrochemical charger/discharger 60b in any order.

As described above, as negative electrode active material layers are formed on both surfaces of a negative electrode current collector, and the two negative electrode active material layers are alternately electrochemically charged, the length of the pre-lithiation section may be adjusted to be slightly longer. For example, when the two negative electrode active material layers formed on both surfaces of a negative electrode current collector are alternately electrochemically charged, the length of the pre-lithiation section may increase about 2 times compared to when a negative electrode active material layer formed on one surface of a negative electrode current collector is electrochemically charged. Specifically, a ratio of lengths of the impregnation section 1A and the pre-lithiation section 1B may be 1.0:2.6 to 1.0:15.0, preferably 1.0:2.8 to 1.0:9.0, and more preferably 1:6 to 1:8. Also, a ratio of lengths of the pre-lithiation section 1B and the aging section 1C may be 2.6:1.0 to 15.0:1.0, preferably 2.8:1.0 to 9.0:1.0, and more preferably 6:1 to 8:1. A ratio of lengths of the pre-lithiation section 1B and the washing bath 2 may be 5.2:1.0 to 30.0:1.0, preferably 5.6:1.0 to 18.0:1.0, and more preferably 12:1 to 16:1.

In addition, descriptions about the 1-1 electrochemical charger/discharger 50a and the 1-2 electrochemical charger/discharger 50b; the 2-1 electrochemical charger/discharger 60a and the 2-2 electrochemical charger/discharger 60b; the 1-1 lithium metal counter electrode 30a and the 1-2 lithium metal counter electrode 30b; and the 2-1 lithium metal counter electrode 41a, 42a and the 2-2 lithium metal counter electrode 41b, 42b may be the same as those about the first electrochemical charger/discharger 50; the second electrochemical charger/discharger 60; the first lithium metal counter electrode 30; and the second lithium metal counter electrode 41, 42 described with reference to FIGS. 1 to 3.

The method of manufacturing a negative electrode according to another embodiment of the present invention may further include aging, washing, drying, and collecting processes. The aging, washing, drying, and collecting processes may be the same as the aging, washing, drying, and collecting processes described with reference to FIGS. 1 to 3.

A negative electrode manufactured by the above-described method exhibits improved reversibility and improved initial efficiency, and the uniform pre-lithiation of the negative electrode is possible, and thus quality consistency may be improved. Accordingly, the negative electrode manufactured by the method of the present invention is preferably applied to a secondary battery, specifically, a lithium secondary battery.

In addition, according to the above-described production method, since the electrolyte impregnation, pre-lithiation, additional aging, additional washing, and/or additional drying processes of the negative electrode structure may be performed at one time in a roll-to-roll manner, processability in the production of a negative electrode can be improved, and quality consistency can also be improved to a superior level.

The secondary battery may include the negative electrode manufactured by the above-described method, a positive electrode disposed to face the negative electrode, a separator interposed between the negative electrode and the positive electrode, and an electrolyte. Details of the negative electrode have been described above, and the positive electrode, separator, and electrolyte may be used without limitation as long as they are typically used in a lithium secondary battery.

The secondary battery is useful in the field of portable devices, such as mobile phones, notebook computers, digital cameras, and the like, and electric vehicles such as hybrid electric vehicles (HEVs).

In addition, the secondary battery may be applied to a battery module including the secondary battery as a unit cell or a battery pack including the battery module.

The battery module or battery pack may be used as a power source of one or more medium-to-large-sized devices selected from a power tool; electric vehicles (EVs), hybrid electric vehicles, and plug-in hybrid electric vehicles (PHEVs); and a power storage system.

Hereinafter, the present invention will be described in detail with reference to examples so that those skilled in the art can easily carry out the present invention. However, the present invention may be embodied in several different forms, and therefore, is not limited to examples described herein.

EXAMPLES

Example 1: Manufacture of Negative Electrode

<Preparation of Negative Electrode Structure>

A negative electrode active material was prepared by mixing natural graphite (average particle diameter ($D_{50}$): 20 μm) and SiO (average particle diameter ($D_{50}$): 5 μm) in a weight ratio of 70:30.

The negative electrode active material, Denka black as a conductive material, styrene butadiene rubber (SBR) as a binder, and carboxymethylcellulose (CMC) as a thickener were mixed in a weight ratio of 92:3:3.5:1.5 to prepare a negative electrode slurry.

The negative electrode slurry was applied onto both surfaces of a copper current collector (thickness: 8 μm, width: 12 cm) as a negative electrode current collector, and the resulting copper current collector was roll-pressed and dried in a 130° C. vacuum oven for 12 hours, thereby fabricating a negative electrode structure including a first negative electrode active material layer (thickness: 70 μm, width: 10 cm) and a second negative electrode active material layer (thickness: 70 μm, width: 10 cm) formed on both surfaces of the negative electrode current collector. In the negative electrode structure, bare parts present at both sides of the negative electrode structure and not having the negative electrode active material layer thereon were formed with a width of 1 cm at the left side and right side of the negative electrode structure.

In addition, two first side parts (width: 0.5 cm) were partitioned at both sides of the first negative electrode active material layer, and a region excluding the side parts was partitioned into a first central part (width: 9 cm). Also, two second side parts (width: 0.5 cm) were partitioned at both sides of the second negative electrode active material layer, and a region excluding the side parts was partitioned into a second central part (width: 9 cm).

The negative electrode structure was wound on a negative electrode roll made of stainless steel and having a diameter of 3 inches.

<Preparation of Pre-Lithiation Bath>

A pre-lithiation bath made of stainless steel and having a length, width, and height of 360 cm×20 cm×50 cm was provided. A pre-lithiation solution was input into the pre-lithiation bath so that the pre-lithiation solution was filled to 20% of the height of the pre-lithiation bath. The pre-lithiation bath was maintained at a temperature of 25° C.

As the pre-lithiation solution, a pre-lithiation solution prepared by adding $LiPF_6$ as a lithium salt at a concentration of 1 M to an organic solvent in which ethylene carbonate (EC) and ethyl methyl carbonate (EMC) were mixed in a volume ratio of 30:70 and adding fluoroethylene carbonate (FEC) as an additive at 2 wt % with respect to the total weight of the pre-lithiation solution was used.

The pre-lithiation bath was divided into an impregnation section, a pre-lithiation section, and an aging section (length of impregnation section:length of pre-lithiation section:length of aging section=2:14:2). In the impregnation section, the pre-lithiation section, and the aging section, a plurality of fixed rolls were installed for smooth movement of the negative electrode structure.

In the pre-lithiation section, a first section and a second section were partitioned in a length ratio of 1:6. Also, a 1-1 lithium metal counter electrode and a 1-2 lithium metal counter electrode with the same length as that of the first section were provided, and a 2-1 lithium metal counter electrode and a 2-2 lithium metal counter electrode with the same length as that of the second section were provided. In the pre-lithiation section, the 1-1 lithium metal counter electrode with the same width as that of the first central part of the first negative electrode active material layer was disposed to face and be spaced apart from the first central part of the first negative electrode active material layer in the first section, and the 2-1 lithium metal counter electrode with the same width as that of the first side part of the first negative electrode active material layer was disposed to face and be spaced apart from the first side part of the first negative electrode active material layer in the second section. Also, in the pre-lithiation section, the 1-2 lithium metal counter electrode with the same width as that of the second central part of the second negative electrode active material layer was disposed to face and be spaced apart from the second central part of the second negative electrode active material layer in the first section, and the 2-2 lithium metal counter electrode with the same width as that of second side part of the second negative electrode active material layer was disposed to face and be spaced apart from the second side part of the second negative electrode active material layer in the second section.

<Impregnation, Pre-Lithiation, and Aging>

Impregnation of negative electrode structure

The negative electrode structure was introduced into and moved through the pre-lithiation bath at a speed of 1 cm/min while being unwound from the negative electrode roll.

The unwound negative electrode structure entered the impregnation section and moved therethrough for 40 minutes, thereby impregnating the negative electrode structure with a pre-lithiation solution.

Pre-Lithiation of Negative Electrode Structure

The negative electrode structure having passed through the impregnation section entered the pre-lithiation section.

The first central part of the first negative electrode active material layer was connected with the 1-1 lithium metal counter electrode through a 1-1 electrochemical charger/discharger, and the first side part of the first negative electrode active material layer was connected with the 2-1 lithium metal counter electrode through a 2-1 electrochemical charger/discharger. The second central part of the second negative electrode active material layer was connected with the 1-2 lithium metal counter electrode through a 1-2 electrochemical charger/discharger, and the second side part of the second negative electrode active material layer was connected with the 2-2 lithium metal counter electrode through a 2-2 electrochemical charger/discharger. As the 1-1 electrochemical charger/discharger, the 1-2 electrochemical charger/discharger, the 2-1 electrochemical charger/discharger, and the 2-2 electrochemical charger/discharger, WBCS3000™ commercially available from WONATECH CO., LTD. was used.

The 1-1 electrochemical charger/discharger, the 1-2 electrochemical charger/discharger, the 2-1 electrochemical charger/discharger, and the 2-2 electrochemical charger/discharger were each sequentially operated for 5 seconds in one or more cycles. During the operation of one electrochemical charger/discharger, the remaining three electrochemical charger/dischargers were turned off.

The charge currents applied to the first central part of the first negative electrode active material layer and the second central part of the second negative electrode active material layer were 9.36 mA/cm$^2$, and each of the first central part of the first negative electrode active material layer and the second central part of the second negative electrode active material layer was electrochemically charged to SOC 18.5%. The charge currents applied to the first side part of the first negative electrode active material layer and the second side part of the second negative electrode active material layer were 1.56 mA/cm$^2$, and each of the first side part of the first negative electrode active material layer and the second side part of the second negative electrode active material layer was electrochemically charged to SOC 18.5%.

The negative electrode structure having passed through the pre-lithiation section entered the aging section and moved therethrough for 40 minutes, thereby aging the negative electrode structure.

<Washing and Drying>

A washing bath made of stainless steel and having a length, width, and height of 20 cm×20 cm×50 cm was provided. A fixed roll was installed between the pre-lithiation bath and the washing bath. The washing bath contained dimethyl carbonate (DMC) as an organic solvent so that DMC was filled to 20% of the height of the washing bath.

The negative electrode structure was taken out of the pre-lithiation bath along the fixed roll and introduced into and moved through the washing bath.

The time taken for the negative electrode structure to move through the washing bath was 20 minutes.

A drying part made of stainless steel and having a length, width, and height of 20 cm×20 cm×50 cm was provided. A temperature of the drying part was 25° C., and the drying part was filled with air. A fixed roll was installed between the washing bath and the drying part. A collecting roll was installed in the drying part.

The washed negative electrode structure was introduced into the drying part along the fixed roll, and the time taken for the negative electrode structure to move through the drying part was 20 minutes.

The negative electrode structure that had moved through the drying part was wound on the collecting roll.

Example 2: Manufacture of Negative Electrode

A negative electrode was manufactured in the same manner as in Example 1, except that a pre-lithiation bath made of stainless steel and having a length, width, and height of 280 cm×20 cm×50 cm was provided, a ratio of lengths of an impregnation section, a pre-lithiation section, and an aging section was 2:10:2, the ratio of lengths of the first section and second section of a pre-lithiation section was 1:4, and the charge current applied to the side part of a first negative electrode active material layer and a second negative electrode active material layer in a second section was 2.34 mA/cm$^2$.

Example 3: Manufacture of Negative Electrode

A negative electrode was manufactured in the same manner as in Example 1, except that a pre-lithiation bath made of stainless steel and having a length, width, and height of 200 cm×20 cm×50 cm was provided, a ratio of lengths of an impregnation section, a pre-lithiation section, and an aging section was 2:6:2, the ratio of lengths of the first section and second section of a pre-lithiation section was 1:2, the charge current applied to the side part of a first negative electrode active material layer and a second negative electrode active material layer in a second section was 4.68 mA/cm², and the time taken to move through a second section was 40 minutes.

Example 4: Manufacture of Negative Electrode

A negative electrode was manufactured in the same manner as in Example 1, except that a pre-lithiation bath made of stainless steel and having a length, width, and height of 520 cm×20 cm×50 cm was provided, a ratio of lengths of an impregnation section, a pre-lithiation section, and an aging section was 2:22:2, the ratio of lengths of the first section and second section of a pre-lithiation section was 1:10, the charge current applied to the side part of a first negative electrode active material layer and a second negative electrode active material layer in a second section was 0.936 mA/cm², and the time taken to move through a second section was 200 minutes.

Comparative Example 1: Manufacture of Negative Electrode

<Fabrication of Negative Electrode Structure>
A negative electrode structure was fabricated in the same manner as in Example 1, except that a central part and a side part were not partitioned.
<Preparation of Pre-Lithiation Bath>
A pre-lithiation bath was prepared in the same manner as in Example 1, except that a pre-lithiation bath made of stainless steel and having a length, width, and height of 90 cm×20 cm×50 cm was provided, a ratio of lengths of an impregnation section, a pre-lithiation section, and an aging section was 4:1:4, a pre-lithiation section was not divided into a first section and a second section, a 1-1 lithium metal counter electrode, a 1-2 lithium metal counter electrode, a 2-1 lithium metal counter electrode, and a 2-2 lithium metal counter electrode were not used, a lithium metal counter electrode (with the same length as that of a pre-lithiation section) with the same width as that of a first negative electrode active material layer was disposed to face and be spaced apart from a first negative electrode active material layer in a pre-lithiation section, a lithium metal counter electrode (with the same length as that of a pre-lithiation section) with the same width as that of a second negative electrode active material layer was disposed to face and be spaced apart from a second negative electrode active material layer in a pre-lithiation section, and the charge current applied in electrochemical charging for pre-lithiation was 9.36 mA/cm².
<Impregnation, Pre-Lithiation, and Aging>
A negative electrode structure was impregnated, pre-lithiated, and aged in the same manner as in Example 1, except that the first negative electrode active material layer was connected with the lithium metal counter electrode disposed at a position facing the same through an electrochemical charger/discharger, the second negative electrode active material layer was connected with the lithium metal counter electrode disposed at a position facing the same through an electrochemical charger/discharger, and the first negative electrode active material layer and the second negative electrode active material layer were not alternately but simultaneously electrochemically charged.
<Washing and Drying>
A negative electrode structure was washed and dried in the same manner as in Example 1.

Comparative Example 2: Manufacture of Negative Electrode

A negative electrode was manufactured in the same manner as in Comparative Example 1, except that a pre-lithiation bath made of stainless steel and having a length, width, and height of 100 cm×20 cm×50 cm was provided, a ratio of lengths of an impregnation section, a pre-lithiation section, and an aging section was 2:1:2, and respective electrochemical charger/dischargers connected to a first negative electrode active material layer and a second negative electrode active material layer were set to a charge current of 9.36 mA/cm² and alternately operated in intervals of 5 seconds.

Comparative Example 3: Manufacture of Negative Electrode

A negative electrode was manufactured in the same manner as in Comparative Example 1, except that a pre-lithiation bath made of stainless steel and having a length, width, and height of 200 cm×20 cm×50 cm was provided, a ratio of lengths of an impregnation section, a pre-lithiation section, and an aging section was 1:3:1, and respective electrochemical charger/dischargers connected to a first negative electrode active material layer and a second negative electrode active material layer were set to a charge current of 1.56 mA/cm² and alternately operated in intervals of 5 seconds.

Comparative Example 4: Manufacture of Negative Electrode

A negative electrode was manufactured in the same manner as in Example 1, except that a pre-lithiation bath made of stainless steel and having a length, width, and height of 160 cm×20 cm×50 cm was provided, a ratio of lengths of an impregnation section, a pre-lithiation section, and an aging section was 1:2:1, the ratio of lengths of the first section and second section of a pre-lithiation section was 1:1, and the charge current applied to the side part of a first negative electrode active material layer and a second negative electrode active material layer in a second section was 9.36 mA/cm².

Experimental Examples

Experimental Example 1: Evaluation of Initial Efficiency

<Production of Coin-Type Half-Cell>
The negative electrode of Example 1 was punched to a constant size, the second negative electrode active material layer was removed from the negative electrode, washing was performed, and the both side parts (first side part and second side part) and central part of the first negative electrode active material layer were individually cut and punched to form three negative electrodes with a coin cell size. A negative electrode for the first side part was used as a negative electrode of Example 1-A, a negative electrode for the central part was used as a negative electrode of Example 1-B, and a negative electrode for the second side part was used as a negative electrode of Example 1-C.

A polyolefin separator was interposed between the negative electrode of Example 1-A and a lithium metal counter electrode, and an electrolyte solution was injected, thereby manufacturing a coin-type half-cell secondary battery according to Example 1-A. Also, secondary batteries according to Example 1-B and Example 1-C were manufactured in the same manner as in Example 1-A, except that the negative electrode of Example 1-B and the negative electrode of Example 1-C were used, respectively.

In addition, secondary batteries of Example 2 (Example 2-A, Example 2-B, Example 2-C), secondary batteries of Example 3 (Example 3-A, Example 3-B, Example 3-C), secondary batteries of Example 4 (Example 4-A, Example 4-B, Example 4-C), secondary batteries of Comparative Example 1 (Comparative Example 1-A, Comparative Example 1-B, Comparative Example 1-C), secondary batteries of Comparative Example 2 (Comparative Example 2-A, Comparative Example 2-B, Comparative Example 2-C), secondary batteries of Comparative Example 3 (Comparative Example 3-A, Comparative Example 3-B, Comparative Example 3-C), and secondary batteries of Comparative Example 4 (Comparative Example 4-A, Comparative Example 4-B, Comparative Example 4-C) were manufactured in the same manner as in Example 1-A, Example 1-B, and Example 1-C, except that the negative electrodes of Examples 2 to 4 and Comparative Examples 1 to 4 were used, respectively.

<Initial Reversibility Test>

The coin-type half-cell manufactured above was subjected to an initial reversibility test using an electrochemical charger/discharger. Charging was carried out at a current of 0.1C-rate up to 0.005 V (vs. Li/Li$^+$), and discharging was carried out at the same current up to 1.5 V. In this case, initial efficiency was measured and calculated as a ratio (%) of discharge capacity to charge capacity, and results thereof are shown in Table 1.

From these results, the initial efficiency of each of the first negative electrode active material layer and the second negative electrode active material layer included in the negative electrode could be calculated. For example, initial efficiency was measured using the coin-type half-cells according to Example 1-A and Example 1-B to confirm the initial efficiency of each of the first negative electrode active material layer and the second negative electrode active material layer in the negative electrode of Example 1.

TABLE 1

|  |  | Initial efficiency (%) |
|---|---|---|
| Example 1 | Example 1-A | 98.9 |
|  | Example 1-B | 99.1 |
|  | Example 1-C | 99.0 |
| Example 2 | Example 2-A | 98.7 |
|  | Example 2-B | 99.0 |
|  | Example 2-C | 98.5 |
| Example 3 | Example 3-A | 98.3 |
|  | Example 3-B | 99.2 |
|  | Example 3-C | 98.3 |
| Example 4 | Example 4-A | 97.2 |
|  | Example 4-B | 99.1 |
|  | Example 4-C | 97.1 |
| Comparative Example 1 | Comparative Example 1-A | 89.2 |
|  | Comparative Example 1-B | 99.0 |
|  | Comparative Example 1-C | 90.1 |
| Comparative Example 2 | Comparative Example 2-A | 91.0 |
|  | Comparative Example 2-B | 99.1 |
|  | Comparative Example 2-C | 91.1 |
| Comparative Example 3 | Comparative Example 3-A | 92.3 |
|  | Comparative Example 3-B | 94.1 |
|  | Comparative Example 3-C | 91.2 |
| Comparative Example 4 | Comparative Example 4-A | 93.1 |
|  | Comparative Example 4-B | 99.1 |
|  | Comparative Example 4-C | 92.4 |

Referring to Table 1, in the case of the negative electrodes of Examples 1 to 4 in which pre-lithiation was performed by setting the charge current applied to a central part to be higher than the charge current applied to a side part, it can be confirmed that as the negative electrode active material layer was uniformly pre-lithiated throughout, excellent initial efficiency was exhibited.

However, in the case of the negative electrodes of Comparative Examples 1 to 4 in which electrochemical charging was performed at one time without partitioning a central part and a side part or a central part and a side part were electrochemically charged with the same charge current, it can be confirmed that as the negative electrode structure shook in roll-to-roll equipment, it was difficult to sufficiently pre-lithiate the side part, and thus the initial efficiency of the side part was degraded.

Experimental Example 2: Evaluation of Capacity Retention Rate

<Preparation of Lithium Secondary Battery>

The negative electrodes manufactured in Examples 1 to 4 and Comparative Examples 1 to 4 were cut into a size of 3 cm×4 cm.

LiNi$_{0.8}$Co$_{0.1}$Mn$_{0.1}$O$_2$ as a positive electrode active material, Super C as a conductive material, and polyvinylidene fluoride (PVDF) as a binder were mixed in a weight ratio of 97:1.5:1.5 to prepare a positive electrode slurry, the positive electrode slurry was applied onto an aluminum current collector, and the resulting aluminum current collector was roll-pressed and dried at 130° C. to produce a positive electrode.

A polypropylene separator was interposed between the negative electrode according to each of Examples 1 to 4 and Comparative Examples 1 to 4 and the above-manufactured positive electrode, and an electrolyte was injected, thereby manufacturing a lithium secondary battery. The electrolyte was prepared by adding LiPF$_6$ as a lithium salt at a concentration of 1 M to an organic solvent in which ethylene carbonate (EC) and ethyl methyl carbonate (EMC) were mixed in a volume ratio of 30:70 and adding fluoroethylene carbonate (FEC) as an additive at 2 wt % with respect to the total weight of the pre-lithiation solution.

<Evaluation of Capacity Retention Rate>

The discharge capacity and capacity retention rate of the lithium secondary batteries according to Examples 1 to 4 and Comparative Examples 1 to 4 were evaluated using an electrochemical charger/discharger. Charging was carried out by applying current at a current density of 0.1 C-rate up to 4.2 V, and discharging was carried out at the same current density up to 2.5 V.

The capacity retention rate was evaluated by measuring the discharge capacities of the lithium secondary batteries according to Examples 1 to 4 and Comparative Examples 1 to 4 at $1^{st}$ and $100^{th}$ cycles and substituting the resulting values into the following Equation 1, and results thereof are shown in Table 2 below.

Capacity retention rate (%)=(Discharge capacity at $100^{th}$ cycle)/(Discharge capacity at $1^{st}$ cycle)×100   [Equation 1]

TABLE 2

|  | Capacity retention rate (%) @ $100^{th}$ cycle |
|---|---|
| Example 1 | 96 |
| Example 2 | 94 |
| Example 3 | 93 |
| Example 4 | 90 |

TABLE 2-continued

|  | Capacity retention rate (%) @ 100th cycle |
|---|---|
| Comparative Example 1 | 78 |
| Comparative Example 2 | 80 |
| Comparative Example 3 | 83 |
| Comparative Example 4 | 81 |

Referring to Table 2, in the case of the negative electrodes of Examples 1 to 4 in which pre-lithiation was performed by setting the charge current applied to a central part to be higher than the charge current applied to a side part, it can be confirmed that as the negative electrode active material layer was uniformly pre-lithiated throughout, excellent lifetime characteristics were exhibited.

However, in the case of the negative electrodes of Comparative Examples 1 to 4 in which electrochemical charging was performed at one time without partitioning a central part and a side part or a central part and a side part were electrochemically charged with the same charge current, it can be confirmed that as the negative electrode structure shook in roll-to-roll equipment, it was difficult to sufficiently pre-lithiate the side part, and lithium was precipitated on a bare part, thereby substantially degrading lifetime characteristics.

LIST OF REFERENCE NUMERALS

1: pre-lithiation bath, 1A: impregnation section, 1B: pre-lithiation section, 1B-(1): first section, 1B-(2): second section, 1C: aging section, 1D: pre-lithiation solution, 2: washing bath, 2A: organic solvent, 3: drying part, 10: negative electrode structure, 11: negative electrode current collector, 12: negative electrode active material layer, 12a: first negative electrode active material layer, 12b: second negative electrode active material layer, 13, 14: side part, 13a, 14a: first side part, 13b, 14b: second side part, 15: central part, 15a: first central part, 15b: second central part, 20: negative electrode roll, 21a, 21b, 22, 23a, 23b, 24: fixed roll, 25: collecting roll, 30: first lithium metal counter electrode, 30a: 1-1 lithium metal counter electrode, 30b: 1-2 lithium metal counter electrode, 41, 42: second lithium metal counter electrode, 41a, 42a: 2-1 lithium metal counter electrode, 41b, 42b: 2-2 lithium metal counter electrode, 50: first electrochemical charger/discharger, 50a: 1-1 electrochemical charger/discharger, 50b: 1-2 electrochemical charger/discharger, 60: second electrochemical charger/discharger, 60a: 2-1 electrochemical charger/discharger, 60b: 2-2 electrochemical charger/discharger

The invention claimed is:

1. A method of manufacturing a negative electrode, comprising:
preparing a negative electrode roll on which a negative electrode structure is wound, the negative electrode structure comprising a negative electrode current collector and a negative electrode active material layer on at least one surface of the negative electrode current collector, wherein the negative electrode active material layer comprises side parts partitioned at both sides of the negative electrode active material layer and a central part partitioned by excluding the side parts;
preparing a pre-lithiation bath comprising a pre-lithiation solution, wherein the pre-lithiation bath is sequentially divided into an impregnation section and a pre-lithiation section;
impregnating the negative electrode structure with the pre-lithiation solution while unwinding the negative electrode structure from the negative electrode roll and moving the negative electrode structure through the impregnation section; and
pre-lithiating the negative electrode structure through electrochemical charging while moving the negative electrode structure through the pre-lithiation section,
wherein during the pre-lithiating step, the pre-lithiation section comprises a first section and a second section, the central part is electrochemically charged in the first section, the side is parts are electrochemically charged in the second section, the central part and the side part parts are alternately electrochemically charged in one or more cycles, and a charge current applied to the central part is higher than a charge current applied to the side parts,
wherein a first lithium metal counter electrode faces and is spaced apart from the central part of the negative electrode active material layer in the first section,
a second lithium metal counter electrode faces and is spaced apart from the side parts of the negative electrode active material layer in the second section,
the first lithium metal counter electrode and the negative electrode structure are connected to each other through a first electrochemical charger/discharger, the second lithium metal counter electrode and the negative electrode structure are connected to each other through a second electrochemical charger/discharger, and
the pre-lithiation is performed by setting a charge current applied from the first electrochemical charger/discharger to be higher than a charge current applied from the second electrochemical charger/discharger and alternately electrochemically charging the central part and the side parts of the negative electrode structure in one or more cycles while alternately operating the first electrochemical charger/discharger and the second electrochemical charger/discharger.

2. The method of claim 1, wherein a ratio of lengths of the first section and the second section is 1:1.2 to 1:15.

3. The method of claim 1, wherein a ratio of lengths of the first section and the second section is 1:3 to 1:8.

4. The method of claim 1, wherein, in the pre-lithiating step, each of the central part and the side parts are electrochemically charged for 0.1 seconds to 80 seconds in one cycle.

5. The method of claim 1, wherein the charge current applied to the side parts are 0.04 times to 0.7 times the charge current applied to the central part.

6. The method of claim 1, wherein the charge current applied to the central part ranges from 5 mA/cm$^2$ to 15 mA/cm$^2$.

7. The method of claim 1, wherein the charge current applied to the side parts ranges from 0.4 mA/cm$^2$ to 7 mA/cm$^2$.

8. The method of claim 1, wherein a ratio of widths of the side parts and the central part is 1:5 to 1:100.

9. The method of claim 1, wherein the pre-lithiation bath further comprises an aging section, and
aging the negative electrode structure while moving the negative electrode structure from the pre-lithiation section to the aging section.

10. The method of claim 1, further comprising washing the pre-lithiated negative electrode structure while taking the pre-lithiated negative electrode structure out of the pre-lithiation bath and moving the pre-lithiated negative electrode structure through a washing bath comprising an organic solvent.

11. The method of claim 1, wherein the negative electrode structure further comprises bare parts present at both sides of at least one surface of the negative electrode current collector and not having the negative electrode active material layer thereon, and the side parts are adjacent to the bare part, and the central part is spaced apart from the bare part.

12. A method of manufacturing a negative electrode, comprising:

preparing a negative electrode roll on which a negative electrode structure is wound, the negative electrode structure comprising a negative electrode current collector, a first negative electrode active material layer on one surface of the negative electrode current collector, and a second negative electrode active material layer on the other surface of the negative electrode current collector, wherein the first negative electrode active material layer comprises first side parts partitioned at both sides of the first negative electrode active material layer and a first central part partitioned by excluding the first side parts, and the second negative electrode active material layer comprises second side parts partitioned at both sides of the second negative electrode active material layer and a second central part partitioned by excluding the second side parts;

preparing a pre-lithiation bath comprising a pre-lithiation solution, wherein the pre-lithiation bath is sequentially divided into an impregnation section and a pre-lithiation section;

impregnating the negative electrode structure with the pre-lithiation solution while unwinding the negative electrode structure from the negative electrode roll and moving the negative electrode structure through the impregnation section; and pre-lithiating the negative electrode structure through electrochemical charging while moving the negative electrode structure through the pre-lithiation section, wherein during the pre-lithiating step, the pre-lithiation section comprises a first section and a second section, the first central part and the second central part are electrochemically charged in the first section, the first side parts and the second side parts are electrochemically charged in the second section, the first central part, the first side parts, the second central part, and the second side parts are sequentially electrochemically charged in one or more cycles in any order, a charge current applied to the first central part is higher than a charge current applied to the first side parts, and a charge current applied to the second central part is higher than a charge current applied to the second side parts, wherein a first lithium metal counter electrode faces and is spaced apart from the first and second central parts of the first and second negative electrode active material layers in the first section, a second lithium metal counter electrode faces and is spaced apart from the first and second side parts of the first and second negative electrode active material layers in the second section, the first lithium metal counter electrode and the negative electrode structure are connected to each other through a first electrochemical charger/discharger, the second lithium metal counter electrode and the negative electrode structure are connected to each other through a second electrochemical charger/discharger, and the pre-lithiation is performed by setting a charge current applied from the first electrochemical charger/discharger to be higher than a charge current applied from the second electrochemical charger/discharger and alternately electrochemically charging the first and second central parts and the first and second side parts of the negative electrode structure in one or more cycles while alternately operating the first electrochemical charger/discharger and the second electrochemical charger/discharger.

13. The method of claim 12, wherein, in the pre-lithiating step, each of the first central part, the first side parts, the second central part, and the second side parts is electrochemically charged for 0.1 seconds to 80 seconds in one cycle.

14. The method of claim 12, wherein the first central part is electrochemically charged before the second central part, the second central part is electrochemically charged before the first side parts, the first side parts are electrochemically charged before the second side parts, and the second side parts are electrochemically charged.

* * * * *